US012183378B2

United States Patent
Sakakura et al.

(10) Patent No.: US 12,183,378 B2
(45) Date of Patent: Dec. 31, 2024

(54) METHOD AND SYSTEM FOR FORMING BIREFRINGENT VOXELS

(71) Applicant: Microsoft Technology Licensing, LLC, Redmond, WA (US)

(72) Inventors: Masaaki Sakakura, Cambridge (GB); Rokas Drevinskas, Cambridge (GB); Daniel Jonathan Finchley Cletheroe, Cambridge (GB); Richard John Black, Cambridge (GB); Austin Nicholas Donnelly, Cambridge (GB); Timothy John Deegan, Cambridge (GB); James Hilton Clegg, Cambridge (GB); Philip Athelstan Wainman, Bishops Stortford (GB); Patrick Neil Anderson, Cambridge (GB); Teodora Ilieva, Cambridge (GB); Thomas Torsten Dr Winkler, Cambridge (GB); Pablo Rafael Andreas Wilke Berenguer, Berlin (DE); Erika Blancada Aranas, London (GB); Bridgette Rosanna Doris Cooper, London (GB); Ioan Alexandru Stefanovici, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/194,231

(22) Filed: Mar. 31, 2023

(65) Prior Publication Data
US 2024/0331732 A1    Oct. 3, 2024

(51) Int. Cl.
*G11B 7/24044*    (2013.01)
*G11B 7/0045*    (2006.01)
(Continued)

(52) U.S. Cl.
CPC ...... *G11B 7/24044* (2013.01); *G11B 7/00456* (2013.01); *G11B 7/1353* (2013.01); *G11B 7/1365* (2013.01); *G11B 2007/0009* (2013.01)

(58) Field of Classification Search
CPC ............ G11B 7/24044; G11B 7/00456; G11B 7/1353; G11B 7/1365; G11B 2007/0009
See application file for complete search history.

(56) References Cited

U.S. PATENT DOCUMENTS 5,136,152 A    8/1992    Lee
5,703,848 A    12/1997    Hofer
(Continued)

FOREIGN PATENT DOCUMENTS

CN    101794587 A    8/2010
CN    106716226 A    5/2017
(Continued)

OTHER PUBLICATIONS

"Application as Filed in U.S. Appl. No. 17/804,368", Filed Date: May 27, 2022, 40 Pages.
(Continued)

*Primary Examiner* — Andrew Sasinowski
(74) *Attorney, Agent, or Firm* — Alleman Hall & Tuttle LLP

(57) ABSTRACT

A method for forming birefringent voxels comprises simultaneously generating a first seed pulse and a first data pulse. The first seed pulse and the first data pulse are spatially-separated laser pulses having different amplitudes. The first seed pulse is focused at a first seed location, and the data pulse is focused at a first data location. The first seed location and the first data location are separated by a predetermined distance along a scan path, with the first seed location being ahead of the first data location. Subsequently, a second seed pulse and a second data pulse are generated,
(Continued)

and focused at a second seed location and second data location, respectively. The second seed and data locations are separated by the predetermined distance. The second data location is the same as the first seed location, resulting in formation of a birefringent voxel.

20 Claims, 10 Drawing Sheets

(51) Int. Cl.
  *G11B 7/1353* (2012.01)
  *G11B 7/1365* (2012.01)
  *G11B 7/00* (2006.01)

(56) References Cited

U.S. PATENT DOCUMENTS

| | | |
|---|---|---|
| 6,118,756 A | 9/2000 | Masuhara et al. |
| 6,940,801 B1 | 9/2005 | Ishii et al. |
| 10,181,336 B1 | 1/2019 | Georgiou et al. |
| 10,236,027 B1 | 3/2019 | Georgiou et al. |
| 10,672,428 B1 | 6/2020 | Black et al. |
| 10,719,239 B2 | 7/2020 | Rowstron et al. |
| 10,768,825 B2 | 9/2020 | Rowstron et al. |
| 10,970,363 B2 | 4/2021 | Stefanovici et al. |
| 11,571,336 B2 | 2/2023 | Knox |
| 2004/0013064 A1 | 1/2004 | Udagawa et al. |
| 2004/0240337 A1 | 12/2004 | Akkermans |
| 2007/0115774 A1 | 5/2007 | Hagiwara |
| 2008/0285399 A1 | 11/2008 | Kobayashi |
| 2009/0245048 A1 | 10/2009 | Ueda et al. |
| 2010/0046345 A1 | 2/2010 | Fujita et al. |
| 2010/0124160 A1 | 5/2010 | Kamiguchi |
| 2010/0187208 A1 | 7/2010 | Dantus et al. |
| 2011/0019511 A1 | 1/2011 | Fort |
| 2012/0069722 A1 | 3/2012 | Miura |
| 2015/0277551 A1 | 10/2015 | Travis |
| 2019/0262936 A1 | 8/2019 | Kobayashi |
| 2021/0124889 A1 | 4/2021 | Adrian et al. |
| 2022/0111470 A1* | 4/2022 | Kazansky ............ B23K 26/082 |
| 2022/0268983 A1 | 8/2022 | Sakakura |
| 2022/0415351 A1 | 12/2022 | Singer |
| 2023/0204969 A1 | 6/2023 | Sun |

FOREIGN PATENT DOCUMENTS

| | | | |
|---|---|---|---|
| EP | 1063645 | A2 | 12/2000 |
| GB | 2592386 | A | 9/2021 |
| JP | 2002264515 | A | 9/2002 |
| WO | 2019079076 | A1 | 4/2019 |
| WO | 2019156740 | A1 | 8/2019 |
| WO | 2019158910 | A1 | 8/2019 |
| WO | 2020109767 | A1 | 6/2020 |
| WO | 2020109768 | A1 | 6/2020 |
| WO | 2020226746 | A1 | 11/2020 |
| WO | 2021155826 | A1 | 8/2021 |

OTHER PUBLICATIONS

Anderson, et al., "Glass: A New Media for a New Era?", In Proceedings of 10th USENIX Workshop on Hot Topics in Storage and File Systems, HotStorage, Jul. 9, 2018, 6 Pages.
Bomzon, et al., "Pancharatnam-Berry Phase in Space-variant Polarization-state Manipulations with Subwavelength Gratings", In Journal of Optics Letters, vol. 26, Issue 18, Sep. 15, 2001, pp. 1424-1426.
Cheng, et al., "Demonstration of High-density Three Dimensional Storage in Fused Silica by Femtosecond Laser Pulses", In Journal of Applied Physics, vol. 94, Issue 3, Aug. 1, 2003, pp. 1304-1307.
Glezer, et al., "Three-dimensional Optical Storage Inside Transparent Materials", In Journal of Optics Letters, vol. 21, Issue 24, Dec. 15, 1996, pp. 2023-2025.
Imai, et al., "100-Layer Recording in Fused Silica for Semi Permanent Data Storage", In Japanese Journal of Applied Physics, vol. 54, Aug. 25, 2015, pp. 1-5.
Minn, et al., "A Robust Timing and Frequency Synchronization for OFDM Systems", In Journal of IEEE Transactions on Wireless Communications, vol. 2, Issue 4, Jul. 4, 2003, pp. 822-839.
Shiozawa, et al., "Simultaneous Multi-Bit Recording in Fused Silica for Permanent Storage", In Japanese Journal of Applied Physics, vol. 52, Sep. 20, 2013, pp. 1-4.
Sopena, et al., "Ultrafast Laser Stabilization by Nonlinear Absorption for Enhanced-precision Material Processing", In Journal of the Optics Letters, vol. 47, Issue 4, Feb. 15, 2022, pp. 993-996.
Strickler, et al., "Three-dimensional Optical Data Storage in Refractive Media by Two-photon Point Excitation", In Journal of Optics Letters, vol. 16, Issue 22, Nov. 15, 1991, pp. 1780-1782.
Watanabe, et al., "Transmission and Photoluminescence Images of Three-dimensional Memory in Vitreous Silica", In Journal of Applied Physics Letters, vol. 74, Issue 26, Jun. 28, 1999, pp. 3957-3959.
"Does Light Change Phase on Refraction?", Retrieved from: https://physics.stackexchange.com/questions/150661/does-light-change-phase-on-refraction, Dec. 5, 2014, 4 Pages.
"Glass-Ceramic", Retrieved from: https://en.wikipedia.org/wiki/Glass-ceramic#, Apr. 8, 2023, 6 Pages.
"Application as Filed in U.S. Appl. No. 18/158,582", Filed Date: Jan. 24, 2023, 56 Pages.
Halliday, et al., "Fundamentals of Physics, 7th Extended Edition", Published by John Wiley & Sons, 2005, pp. 960-961.
Murphy, Douglas B., "Differential Interference Contrast (DIC) Microscopy and Modulation Contrast Microscopy", Published in book Fundamentals of Light Microscopy and Electronic Imaging, 2001, pp. 153-168.
Yu, et al., "CS50's Introduction to Artificial Intelligence with Python", Retrieved from: https://cs50.harvard.edu/ai/2020/notes/3/, 2023, 16 Pages.
Zhang, et al., "Three-Dimensional Holographic Parallel Focusing with Feedback Control for Femtosecond Laser Processing", In Journal of Optics and Lasers in Engineering, vol. 151, Apr. 1, 2022, 7 Pages.
"International Search Report and Written Opinion Issued in PCT Application No. PCT/US20/021926", Mailed Date: Jun. 26, 2020, 11 Pages.
"Notice of Allowance Issued in China Patent Application No. 202080034325.5", Mailed Date: Mar. 8, 2023, 4 Pages.
"Notice of Allowance Issued in South African Patent Application No. 2021/07557", Mailed Date: Nov. 9, 2022, 1 Page.
"Notice of Allowance Issued in U.S. Appl. No. 16/408,374", Mailed Date: Feb. 6, 2020, 9 Pages.
"Office Action and Search Report Issued in China Patent Application No. 202080034325.5", Mailed Date: Oct. 8, 2022, 15 Pages.
Chen, Zhihui, "Preparation of Ferroelectric Thin Films and Research on New Ferroelectric Memory", In China Outstanding Doctoral Dissertation, May 20, 2015, 127 Pages.
International Search Report and Written Opinion received for PCT Application No. PCT/US2024/019618, Jul. 8, 2024, 19 pages.
International Search Report and Written Opinion received for PCT Application No. PCT/US2024/019819, Jul. 8, 2024, 17 pages.
Invitation To Pay Additional Fees received for PCT Application No. PCT/US2024/019619, Jul. 8, 2024, 11 pages.
Non-Final Office Action mailed on Apr. 22, 2024, in U.S. Appl. No. 18/194,161, 07 pages.
Notice of Allowance mailed on Apr. 24, 2024, in U.S. Appl. No. 18/194,113, 09 pages.

* cited by examiner

METHOD AND SYSTEM FOR FORMING BIREFRINGENT VOXELS

BACKGROUND

There is substantial demand for data storage. It is estimated that cloud storage providers will in the near future need data storage capacities of the order of zettabytes, a zettabyte being one trillion gigabytes ($10^{21}$ bytes). Much of the data will need to be stored for extended periods of time.

Examples of data storage technologies currently in widespread use include hard disk drives, magnetic tape, flash memory, and optical discs. All of these technologies have drawbacks which require data to be periodically copied onto replacement media. This is costly in terms of both energy usage and hardware requirements.

Magnetic storage media such as hard drives and magnetic tape suffer from gradual demagnetization. Flash memory is subject to read disturb effects, where repeatedly reading from a particular flash cell causes failure of surrounding flash cells. The reflective materials used for data storage in optical media such as DVDs degrade over time.

Birefringent optical data storage media have been proposed as a solution to these drawbacks. A birefringent optical data storage medium comprises a transparent substrate, such as a quartz glass substrate. Data are encoded in 3-dimensional nanostructures formed in the substrate. These nanostructures are referred to as voxels.

A voxel has optical properties which differ from those of the surrounding bulk substrate. In particular, voxels are birefringent, and in other words display different refractive indices depending upon the polarization and/or direction of incident light. The optical properties of the voxels can be controlled at the time the voxels are written into the substrate. The optical properties of the voxels are used to encode data.

Birefringent optical data storage media and their manufacture have been described by e.g. Anderson et al, Glass: A New Media for a New Era? 10th USENIX Workshop on Hot Topics in Storage and File Systems (HotStorage 18), 2018; and in U.S. Pat. No. 10,236,027 B1.

SUMMARY

In one aspect, there is provided a method of forming a birefringent voxel in a transparent substrate. The method comprises:

simultaneously generating a first seed pulse and a first data pulse, the first seed pulse and the first data pulse being spatially-separated laser pulses, and an amplitude of the first seed pulse being different from an amplitude of the first data pulse;

focusing the first seed pulse at a first seed location in a substrate and focusing the data pulse at a first data location in the substrate, the first seed location and the first data location being separated by a predetermined distance along a scan path, with the first seed location being ahead of the first data location in the scan path;

subsequent to focusing the first seed pulse at the first seed location and focusing the data pulse at the first data location, simultaneously generating a second seed pulse and a second data pulse, the second seed pulse and the second data pulse being spatially-separated laser pulses, and an amplitude of the second seed pulse being different from an amplitude of the second data pulse; and focusing the second seed pulse at a second seed location in the substrate and focusing the data pulse at a second data location in the substrate, the second seed location being separated from the second data location by the predetermined distance along the scan path, the second seed location being ahead of the first seed location and the second data location in the scan path, and wherein the second data location is the same as the first seed location resulting in formation of a birefringent voxel.

A related aspect provides a transparent optical data storage medium, obtainable by the method.

Another aspect provides a system for forming birefringent voxels in a transparent substrate. The system comprises a pulsed laser source; a beam splitter arranged downstream of the pulsed laser source along an optical path, and a focusing optic downstream of the beam splitter on the optical path. The beam splitter comprises a retardation plate; a first polarization selective diffractive optic downstream of the quarter-wave plate along the optical path; and a second polarization selective diffractive optic downstream of the first polarization selective diffractive optic along the optical path. The system is useful for implementing a method as described herein.

Still another aspect provides a beam splitter. The beam splitter comprises a retardation plate; a first polarization selective diffractive optic downstream of the retardation plate along an optical path; and a second polarization selective diffractive optic downstream of the first polarization selective diffractive optic along the optical path. The beam splitter may allow for generation of split laser pulses having a controllable amplitude ratio.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION

Figure 1:
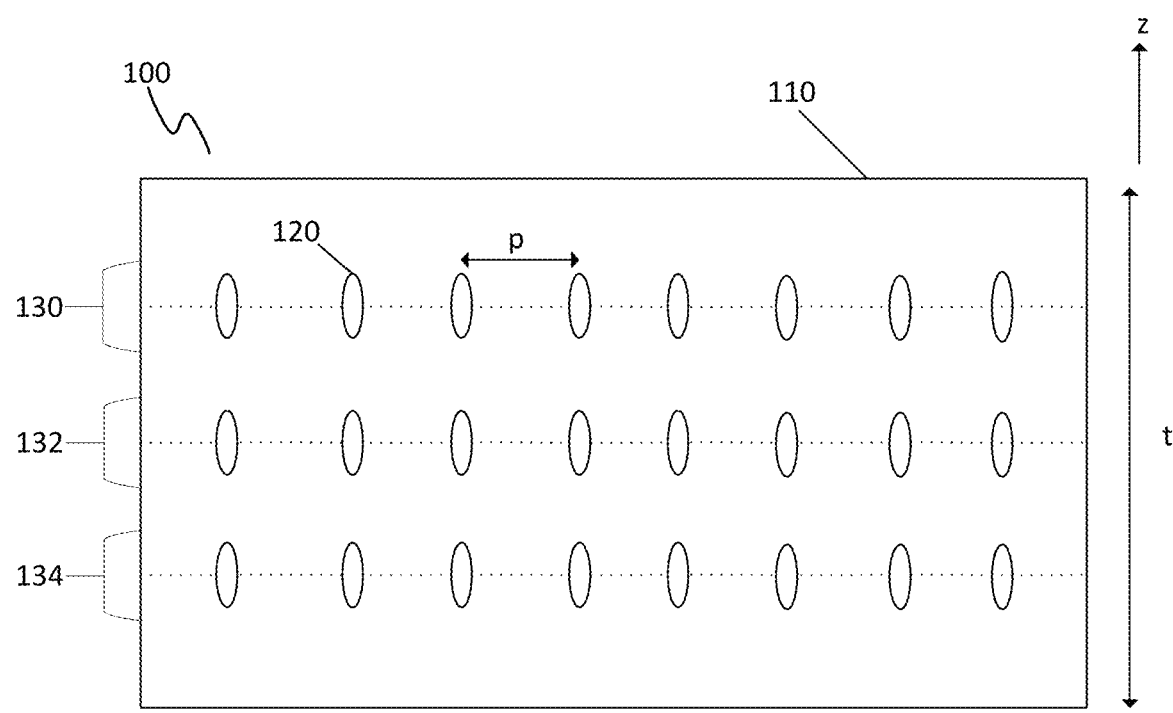
FIG. 1 is a schematic cross-section of a birefringent optical data storage medium.

The structure of an example birefringent optical data storage medium will first be explained with reference to FIG. 1, which is a schematic cross-section of the optical data storage medium.

The data storage medium 100 comprises a substrate 110 having birefringent voxels 120 embedded therein.

The substrate 110 may comprise glass, in particular fused quartz. Fused quartz may also be referred to as silica glass. Glass has excellent chemical and thermal stability, and data storage media based on glass substrates have an expected lifespan extending to hundreds of years. As such, optical data storage media are useful for long-term archival of data.

The shape and dimensions of the substrate are not particularly limited. FIG. 1 illustrates a cuboid substrate. In variants, the substrate may have any shape (e.g., cylindrical).

The substrate typically has a thickness t of up to 10 mm, optionally up to 5 mm, further optionally in the range 200 µm to 2 mm in the z direction. More generally, the thickness of the substrate may be selected as appropriate based on the capabilities of the imaging system to be used to image the voxels. The z direction is the direction in which light will be transmitted through the substrate when imaging the voxels. Attenuation of light passing through the substrate increases as a function of the distance travelled, and providing a relatively thin substrate may limit such attenuation.

A plurality of voxels 120 is embedded in the substrate 110. A voxel is a discrete volume of the substrate which has been modified to have a non-native birefringence, in other words, a birefringence which differs from that of bulk substrate material.

A voxel has a position which can be described by a set of coordinates x, y, z. A voxel may exhibit birefringence, in other words, may have different refractive indices for light of different polarizations. A voxel may cause a change in the angle and ellipticity of polarization of the light. A voxel has a linear retardance. Linear retardance is a measure of the magnitude of the phase shift between specific orthogonal linear polarization components of light after the light passes through the voxel. The direction of the electric field oscillation of the specific orthogonal polarization component that gives larger phase shift is called the azimuth of the birefringence.

The position, retardance, and change in the angle of polarization of a voxel are controllable when writing the voxel to the substrate. Any of these properties, or any combination of these properties, may be used to encode digital data.

In the illustrated example, the voxels 120 are arranged as a stack of layers. The stack comprises a top layer 130, an intermediate layer 132, and a bottom layer 134. Any number of layers of voxels may be present. For example, an optical data storage medium may include from 1 to 100 layers of voxels.

Voxels within a layer are separated from each other laterally. The distance between neighboring voxels within a layer may be referred to as the pitch, p. In general, the more closely spaced the voxels, the greater the density of data which may be stored in the optical data storage medium per unit area.

To form a birefringent voxel in a substrate, at least two laser pulses are focused at a location in the substrate. Each laser pulse causes photoexcitation of the material, inducing a physical change in the substrate material at that location.

The substrate is most typically a transparent substrate. In such implementations, voxels are usually embedded within the body of the substrate, though forming voxels at the surface of the substrate is also possible.

The use of opaque or semi-transparent substrates is also contemplated. In such implementations, voxels are formed at the surface of the substrate.

A voxel which is formed on a surface may be referred to as a laser induced periodic surface structure, "LIPSS".

The first pulse is referred to as a "seed pulse". The seed pulse creates a seed modification, which may be a nano-void or any other isotropic structure.

The second and any subsequent pulses are referred to as "data pulses". The data pulse(s) are polarized laser pulse(s), focused on the location of the seed modification. The data pulse(s) modify the structure of the seed modification, thereby creating a birefringent voxel.

The data pulse(s) may have a linear, elliptical, or circular polarization state. The birefringence of the voxel is determined by the polarization of the data pulse(s). For example, the azimuth of the birefringence is controllable by varying the polarization angle of the data pulse(s). This allows for polarization-multiplexed optical data recording.

Seed pulses have higher amplitude (in other words, are laser pulses of higher energy) than data pulses.

To avoid thermal damage to the substrate, a delay is required between the seed pulse and the data pulse.

There are two existing approaches for forming birefringent voxels, referred to as "hot writing" and "cold writing", respectively.

In a hot writing approach, the seed pulse and data pulse used to form a given voxel are applied sequentially through the same light path. These steps are then repeated for each voxel to be written. To increase throughput, the substrate is moved during the writing process.

To form a voxel successfully, the seed pulse and data pulse must be focused at points which are sufficiently close to one another. The distance between the focal point of the seed pulse for a voxel and the focal point of the last data pulse for the voxel is referred to as the "walk-off distance".

The acceptable "walk-off distance" constrains the speed at which the focal point of the write head can move, as well as requiring precise relative positioning of the substrate and write head. The "walk-off distance" in a hot writing approach is given by the speed of movement of the focal point with respect to the substrate, divided by the pulse rate of a laser light source. The acceptable walk-off distance is often smaller than one tenth of voxel pitch.

A typical laser light source operates a uniform pulse rate of the order of tens of megahertz. The maximum speed of movement of the focal point with respect to the substrate is slow compared to the laser pulse rate. Consequently, many laser pulses must be discarded. In a typical implementation of hot writing, about 80% of the laser pulses are wasted.

Further, because seed pulses and data pulses have different amplitudes, the hot write process requires fast modulation of the amplitude of the laser pulses. Fast modulation generates significant signal noise and instability.

In a cold writing approach, a medium is prepared by forming seed modifications in a substrate in a first scan. Data pulses are then applied to the seed modifications in a second scan.

The cold writing approach overcomes some of the limitations of hot writing. Fast modulation is not required, reducing hardware costs and eliminating one source of signal noise.

Cold writing still has some limitations. Since two scans are required, the maximum possible throughput of the cold writing approach is half the pulse rate of the laser. Aligning the data pulses with the seed modifications is challenging, and becomes increasingly difficult at faster scan rates. Further, there is a considerable delay between forming the seed modification and applying the data pulse, making this technique susceptible to temporal changes in the calibration of the write system.

Provided herein is a method of forming birefringent voxels in a transparent substrate, which method may address one or more of the limitations of existing methods.

The method is referred to as "pseudo-single pulse writing", and involves splitting a single laser pulse into two or more spatially-separated pulses with independently modulated amplitudes. The pulses are delivered to a transparent substrate simultaneously. At least one of the split pulses serves as a seed pulse, and at least one other of the split pulses serves as a data pulse. These steps are iterated while scanning along a scan path in the transparent substrate. The data pulse of a later iteration arrives at the location of a seed modification formed by the seed pulse of an earlier iteration, thereby forming the birefringent voxels.

The method may allow voxels to be written to a substrate at a rate which approaches the pulse rate of the laser, improving throughput. The method may reduce the number of discarded laser pulses, thereby improving hardware utilization efficiency and reducing energy consumption.

Figure 2:
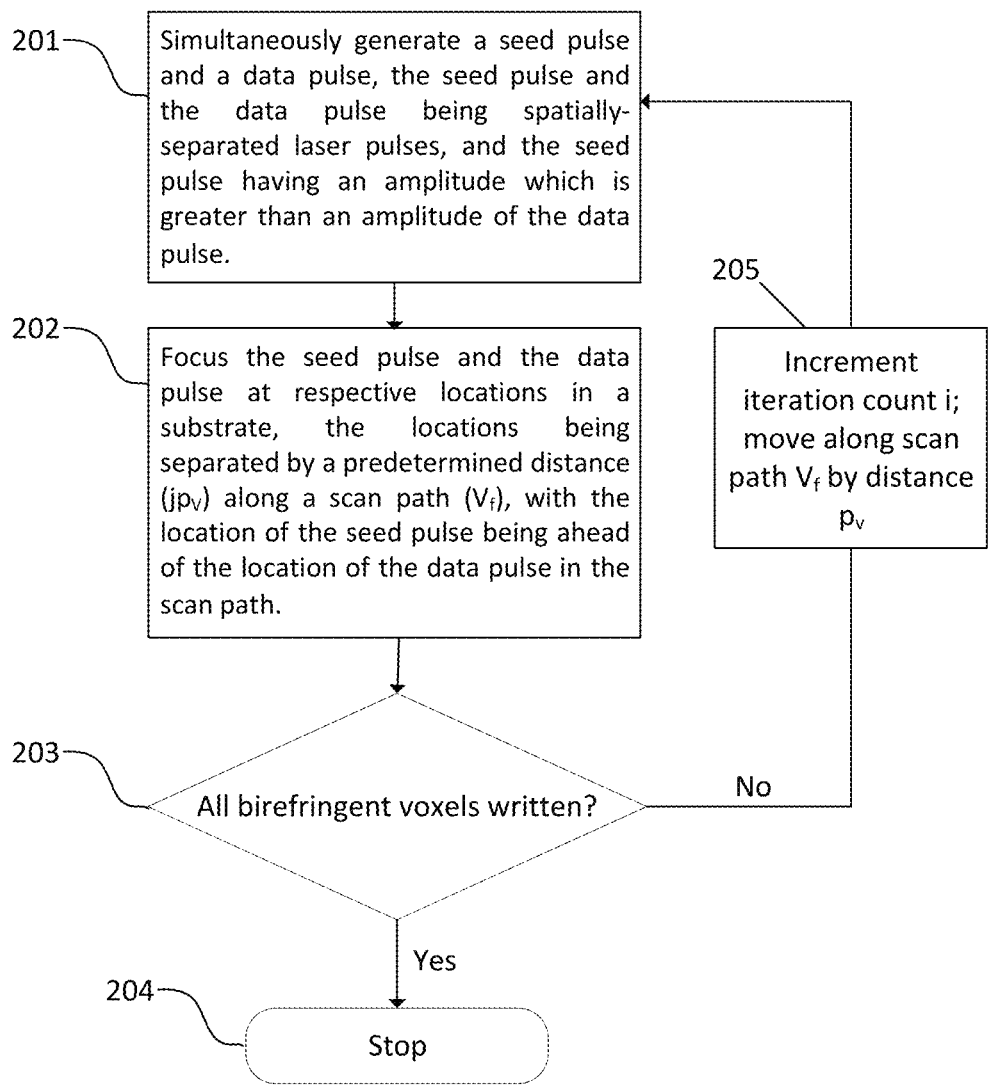
FIG. 2 is a flow diagram outlining a method of forming birefringent voxels in a transparent substrate.

The method will now be explained with reference to FIGS. 2 and 3A to 3D. FIG. 2 is a flow diagram outlining the method. FIGS. 3A to 3D illustrate states obtained following a series of iterations of the method.

The present method is an iterative method. The number of iterations performed $N_s$ is a non-zero integer corresponding to the number of seed modifications to be formed in the substrate. As will become apparent from the discussion below, $N_s$ is equal to the number of birefringent voxels to be written plus a non-zero integer constant.

Each iteration of the method comprises the operations of blocks 201 and 202.

At block 201, a seed pulse S and a data pulse D are generated simultaneously. The operations of this block typically comprise generating a source laser pulse using a laser source, and splitting the source laser pulse into the seed pulse and the data pulse. The use of two or more laser sources which generate synchronized pulses is also contemplated.

The laser source may be a femtosecond laser. The laser source may be a pulsed laser source which generates laser pulses at a time interval $t_p$.

The nature of the beam splitter is not particularly limited and may be selected as appropriate. The laser pulse may be split by a passive beam splitting technique or an active beam splitting technique. Example techniques include the use of polarization gratings, a polarization beam-splitter, an acousto-optic deflector, or a spatial light modulator.

The seed pulse and the data pulse have different respective amplitudes.

The seed pulse has an amplitude selected to form a seed modification in a transparent substrate. The seed modification may be any modification to the structure of the transparent substrate which results in a local change in the refractive index of the substrate compared to the refractive index of a pristine, unmodified substrate. The seed modification is typically isotropic. In other words, the same refractive index regardless of the polarization of light used to probe the seed modification.

Illustrative examples of seed modifications include the creation of a densified or rarefied area; a local glass-matrix change; crystallization or amorphization; and the formation of nanoscopic voids.

The seed pulse may be polarized or unpolarized.

The data pulse has an amplitude which is selected to modify a seed modification to induce birefringence. The amplitude of a data pulse is typically lower than the amplitude of the seed pulse.

The data pulse is polarized.

The method may further comprise modulating the polarization of the data pulse. For example, the data pulse may pass through a polarization state generator. By modulating the polarization of the data pulse, the birefringence properties of the voxel formed by the data pulse may be varied.

The polarization of the data pulse may be set individually for each iteration of the method.

In principle, more than one data pulse may be used, however the use of two or more data pulses per voxel offers no particular advantage. The inventors have found that the azimuth of a birefringent voxel is determined by the last data pulse to arrive at the voxel.

Upon arrival at the transparent substrate, the seed pulse and the data pulse are spatially-separated by a predetermined distance.

The predetermined distance may have a fixed value for all iterations of steps 201 and 202. The predetermined distance may be $jp_v$, where j is a spacing factor, and $p_v$ is a voxel pitch in a scan direction $V_f$ for the optical data storage medium. The spacing factor j is a non-zero integer and may for example be in the range 1 to 5.

To avoid or reduce cross-talk between the seed and data pulses, the predetermined distance is typically at least double the wavelength of the laser light.

At block 202, the seed pulse and the data pulse are focused at respective locations in the transparent substrate. The seed pulse and the data pulse are separated by the predetermined distance $jp_v$, with the seed pulse being ahead of the data pulse in a scan direction $V_f$.

The seed pulse and data pulse may pass through the same optical components before arriving at the transparent substrate. This may allow for more consistent relative positioning of the seed and data pulses, since any variations in operating parameters of components will affect both the seed and data pulses equally.

Alternatively, the seed and data pulses may follow different light paths. For example, the data pulse may pass through a polarization state generator and the seed pulse may bypass the polarization state generator. This may introduce a small difference (e.g., of less than or equal to 1 m, more typically less than or equal to 10 cm) between the path length of the seed and data pulses. Pulses which pass along different paths are still considered to arrive simultaneously, since the difference in arrival time is negligible compared to the speed of movement of the substrate relative to the write head.

Focusing a seed pulse at a location in the transparent substrate forms a seed modification at that location.

Focusing a data pulse at the location of a seed modification to within a small tolerance, referred to as a walk-off distance, forms a birefringent voxel. By way of illustration, a typical maximum walk-off distance may be up to 100 nm.

Focusing a data pulse at a location other than the location of a seed modification may form a weak modification, or no modification.

In the flowchart of FIG. 2, it is tested at decision block 203 whether all of the desired birefringent voxels have been written to the transparent substrate. If so, then the method proceeds to block 204 and terminates.

If not, then the method performs a further iteration of the steps of blocks 201 and 202. In the further iteration, the focal points for the seed and data pulses are moved in the scan direction $V_f$ by a distance $p_v$, corresponding to the voxel pitch in the scan direction, as shown in block 205.

FIGS. 3A to 3D show example states reached following a sequence of iterations of the above method.

The value of an index i will be used to keep track of the iteration currently under discussion. The convention of 0-indexing is followed. The value of i is incremented by 1 at each iteration. Using an index may be convenient in implementations where the method is implemented as a computer-controlled process.

Figure 3A:
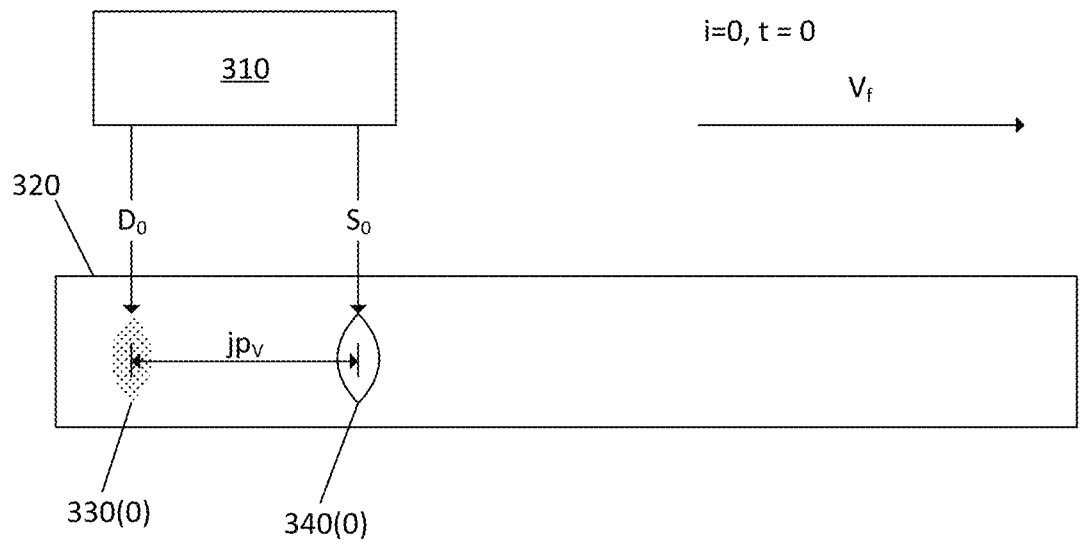
FIGS. 3A to 3D illustrate an optical data storage medium after various numbers of iterations of the method of FIG. 2.

FIG. 3A illustrates a zeroth iteration of the method of FIG. 2 (i=0).

Figure 6:
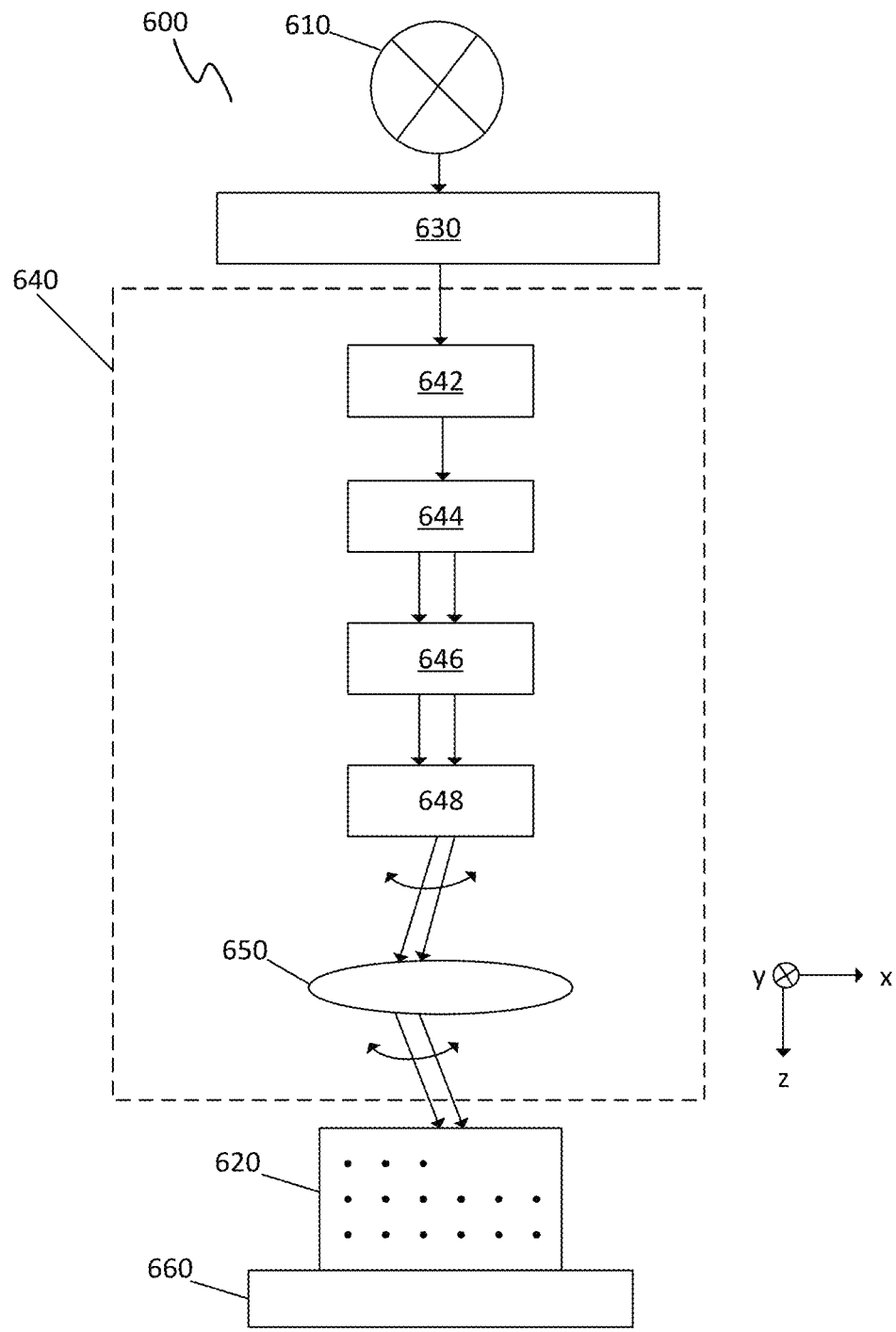
FIG. 6 is a block diagram of a write head useful for implementing the method of FIG. 2.

At a time point t=0, write head 310, which may be a write head 600 as described below with reference to FIG. 6, focusses data pulse $D_0$ and seed pulse $S_0$ at respective locations in substrate 320. As previously described, the data pulse and seed pulse are generated and delivered simultaneously to the substrate.

Data pulse Do arrives at an unmodified portion of the substrate, and forms a zeroth weak modification 330(0) in substrate 320.

Seed pulse $S_0$ forms a seed modification 340(0) at a position which is ahead of the weak modification 330(0) by a distance $jp_v$ in the scan direction $V_f$, recalling that $p_v$ will be the voxel pitch in the scan direction in the finished optical data storage medium, and that j is a non-zero integer. In the example illustrated in FIGS. 3A to 3D, j is 2.

There remain voxels to be written. The method proceeds via block 205, in which the aim of the write head is shifted by distance $p_v$ in scan direction $V_f$. Moving the aim of the write head may comprise adjusting a scanning optic of the write head 310 and/or moving the substrate and/or write head relative to one another.

Figure 3B:
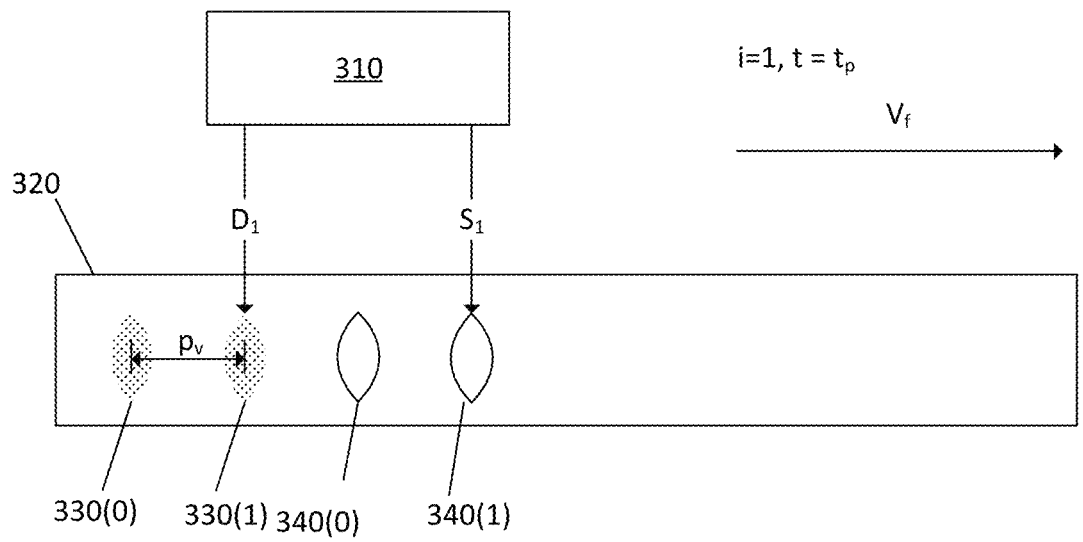
Figure 3C:
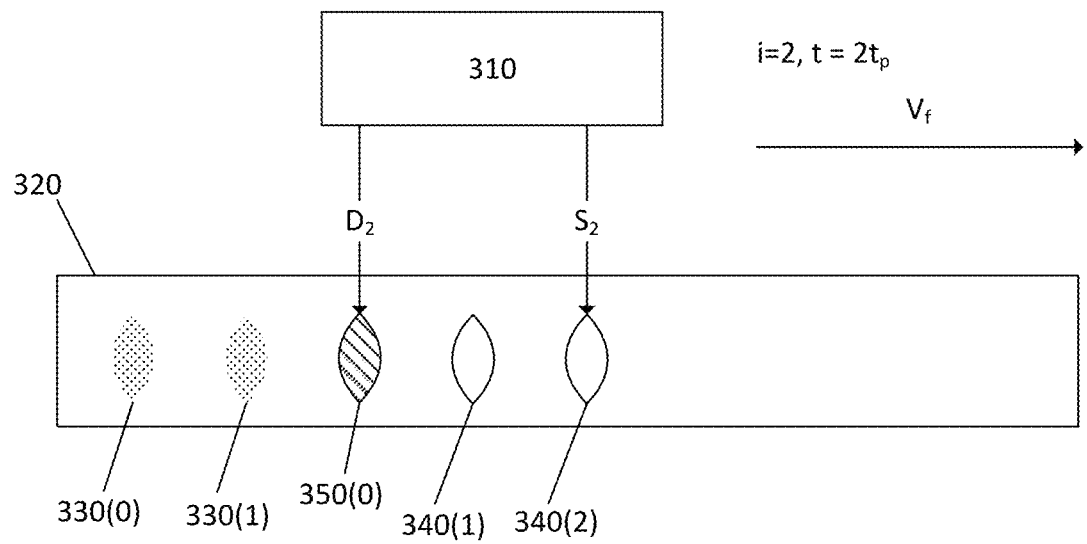

The method proceeds to the next (first, i=1) iteration, shown in FIG. 3B.

The first iteration occurs at time point $t_p$. $t_p$ is the time interval between the generation of pulses by the laser light source of write head 310. Put differently, the first iteration uses the source laser pulse generated immediately subsequent to the source laser pulse used in the zeroth iteration.

Data and seed pulses $D_1$, $S_1$ are generated and focused at respective positions in the substrate 320, in accordance with blocks 201 and 202 of FIG. 2.

Data pulse $D_1$ is aimed at an unmodified region of the substrate, and forms a further weak modification 330(1). The further weak modification 330(1) is downstream from the initial weak modification 330(0) in scan direction $V_f$ by the pitch $p_v$.

Seed pulse $S_1$ forms a further seed modification 340(1), downstream from the initial seed modification 340(0) in scan direction $V_f$ by the pitch $p_v$.

After this iteration, no voxels have been formed. The aim of the write head is incremented by pitch $p_v$ in scan direction $V_f$, and the method proceeds to a second (i=2) iteration illustrated in FIG. 3C.

The second (i=2) iteration occurs at time point $2t_p$, and uses the laser pulse generated immediately after the laser pulse used in the first (i=1) iteration.

Again, the source laser pulse is split into data and seed pulses $D_2$, $S_2$ aimed at positions which are a distance of $p_v$ further in the scan direction than the target positions of the preceding $D_1$, $S_1$ pulses.

Seed pulse $S_2$ is aimed at a blank region of the substrate, and forms a seed modification 340(2).

The index for this iteration is equal to the factor j which describes the spacing between data and seed pulses. Data pulse $D_2$ arrives at the location of seed modification $S_0$ from the zeroth (i=0) iteration of the method. Rather than forming a weak modification 330, data pulse $D_2$ modifies seed modification 340(0) to form a birefringent voxel 350(0). By modulating the polarization of data pulse $D_2$, the birefringence of voxel 350(0) may be tuned as desired to encode a data symbol.

As will be appreciated, the data pulse used to form voxel 350(0) arrives at the seed modification sometime after formation of the seed modification. This allows a time interval of $jt_p$ for the substrate to cool, thereby avoiding thermal damage to the substrate. For example, at a laser repetition rate of 50 MHz, the period between laser pulses $t_p$ is 20 ns. A spacing factor j of 5 provides a cooling time of 100 nanoseconds between the arrival of a seed pulse and a data pulse at any given location.

The cooling time may be selected as appropriate based on the material chosen, and may be controlled by varying the spacing factor j and/or the laser pulse interval $t_p$. Of these parameters, modifying the spacing factor j may allow cooling time to be adjusted without sacrificing data throughput.

The method continues for further iterations as long as voxels remain to be written.

A generalized iteration i of the method occurs at time point $it_p$, using the $i^{th}$ pulse from the laser source. The pulse from the laser source is split into a data pulse and a seed pulse. The data pulse is delivered to a position $ip_v$ units along a scan path $V_f$. The seed pulse forms a seed modification at position $(i+j)p_v$ units along the scan path. If the iteration count i is greater than or equal to the spacing factor j, then a birefringent voxel is formed at position $(i-j)p_v$ along the scan direction $V_f$, otherwise, the data pulse arrives at a blank region and forms a weak modification.

Figure 3D:
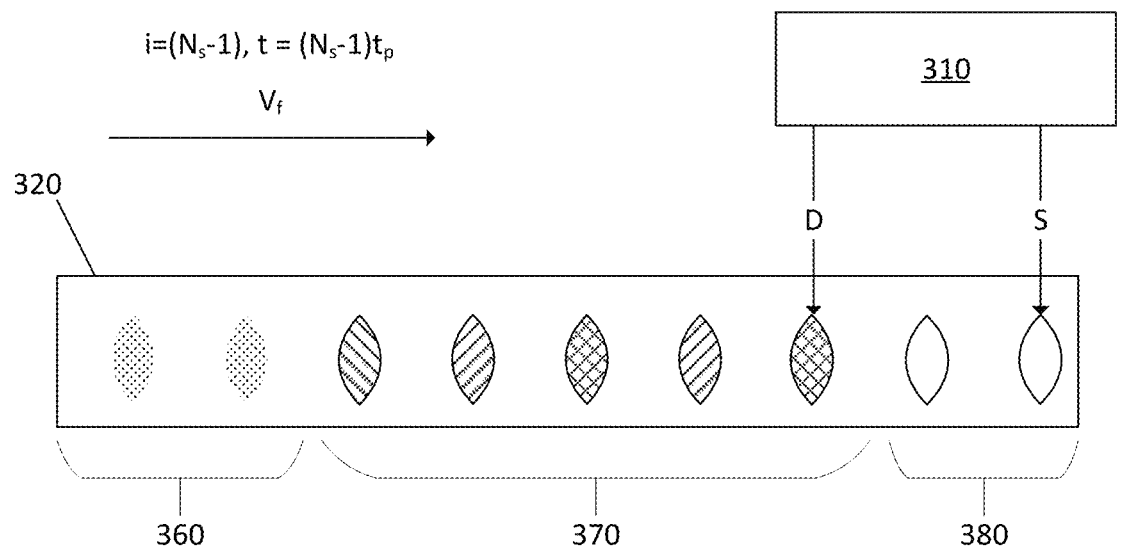

The product of a final iteration is illustrated in FIG. 3D.

The method forms an optical data storage medium 320 having j weak modifications in a data margin 360. Downstream of the data margin in the scan direction $V_f$ used when writing the substrate, a data array 370 including $(N_s-2j)$ voxels is present.

The birefringence of each voxel in the data array may be independently controlled by modulating the polarization of the corresponding data pulses, resulting in voxels which encode different data symbols, illustrated by different shading patterns in FIG. 3D.

Downstream of the data array 370, a seed margin 380 including j non-birefringent seed modifications is present.

When the method is operating under steady state conditions, i.e. after forming the data margin and before beginning to form the seed margin, the method may use every pulse generated by the laser source usefully to form a voxel.

Overheads are small, since j is small (e.g., in the range 1 to 5) compared to the number of voxels, which has no particular upper limit.

Various modifications may be made to the illustrated example.

In the example, j is a non-zero integer. This may minimize walk-off distances, thereby increasing voxel quality and hence, the number of bits which may be stored per voxel. In variants, j may be a non-integer value provided that the walk-off distance is not so large as to prevent formation of voxels.

The example has been explained with reference to writing a single row of voxels. Two or more rows may be written. When two or more rows are written, the rows may be written simultaneously in parallel.

The example shows relative motion of the write head and substrate. More generally, any technique or combination of techniques which allows adjustment of the aim of the write head may be used. The aim may be adjusted by adjusting orientation of a beam scanner of the write head; moving the write head; moving the substrate; and/or adjusting a focal depth of the write head.

The example shows the writing of a single layer of voxels. Multiple layers of voxels may be written to increase data storage capacity per unit volume.

The seed margin may in principle be omitted, by directing data pulses to the additional seed modifications in the seed margin. However, this may involve modification to the write head which may not be cost-effective.

In the example, the scan path is linear. In variants, the scan may follow any suitable path. The scan path may be a spiral, particularly in implementations where the substrate is a cylinder or disc. The scan path may be a raster scan path. The scan path may be a serpentine scan path, in other words a scan path having a square wave shape. When following a scan path which includes reversing a direction of the scan, one or more optical components of the write head (e.g., the beam splitter) is adjusted such that the seed pulse remains ahead of the data pulse.

The example illustrates pulses which are separated in a direction perpendicular to the direction of propagation of the laser light. In a variant, the spatial separation may alternatively or additionally be in the direction of propagation. Polarization lenses may be used to achieve splitting in the direction of propagation.

The described method may be parallelized, with several instances of the method occurring simultaneously. Parallelization may involve the use of an additional beam splitter to divide a source laser pulse amongst two or more write paths, with each write path being configured to generate a seed pulse and a data pulse from an input pulse. Alternatively, each parallel write path may have a respective laser source.

Figure 4:
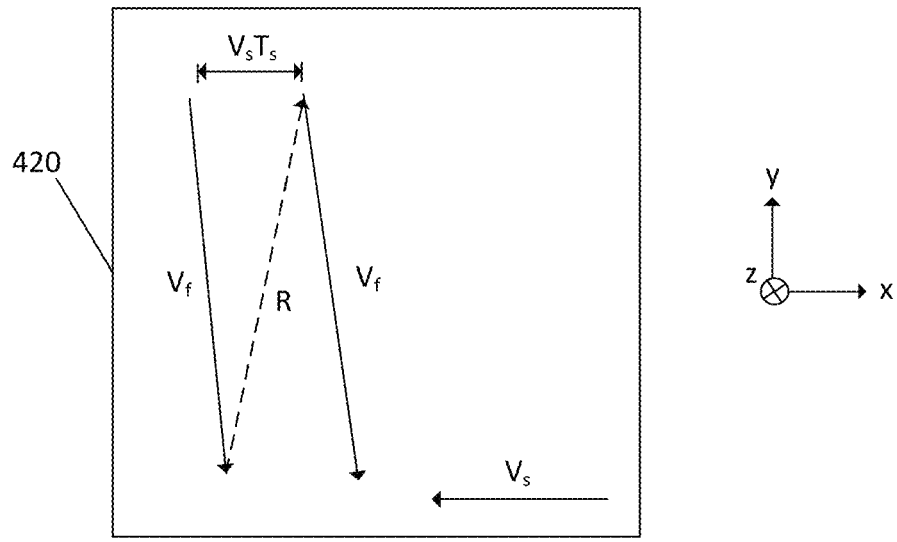
FIG. 4 is an illustration of a raster scan pattern used in a method of forming birefringent voxels.

An example raster scan is illustrated in FIG. 4.

In the illustrated example, substrate 420 is translated continuously in a −x direction at velocity $V_s$. The write head moves along a y axis. Seed and data pulses propagate in the z direction.

The write head is scanned along a first linear scan path $V_f$ in the −y direction to write a row of voxels using the method explained with reference to FIGS. 2 and 3. The write head then moves in the +y direction to return to a home position, tracing reset path R with respect to the substrate 420. No voxels are written as the write head returns to the home position. This scan pattern is repeated with a period of $T_s$, until all desired lines of voxels have been written.

This scanning process forms lines of birefringent voxels, which may be referred to as scanlines. Adjacent scanlines are spaced from one another by distance $V_sT_s$. Voxels within a scanline are spaced from one another by pitch $p_v$, with the pitch $p_v$ being the product of the period of the laser source $t_p$ and the scan velocity for the row $V_f$. The separation between scanlines $V_sT_s$ may be different from the pitch $p_v$ between voxels within a scanline.

The scanlines are tilted with respect to the y axis by $V_s/V_f$, as a result of the continuous motion of the substrate and write head. $V_s/V_f$ is typically of the order of a few milliradians. The tilt may be reduced or eliminated by angling the substrate with respect to the scan direction $V_s$.

Figure 5:
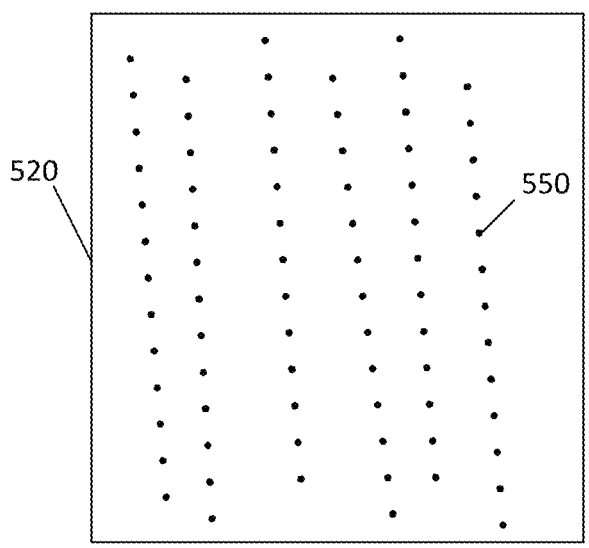
FIG. 5 is a schematic plan view of an optical data storage medium obtainable following the scan path of FIG. 4.

An optical data storage medium 520 obtained by the scanning process of FIG. 4 is illustrated in FIG. 5. In an ideal case, voxels would be arranged in evenly-spaced scanlines, with each scanline being angled consistently with respect to the substrate.

As may be seen, the geometry of the scanlines of voxels 550 may deviate from the ideal case. Factors such as tolerances in mechanical alignment, drift of the properties of optical components (e.g., due to temperature changes), and fluctuations of the laser source may lead to shifts in positions of the voxels.

The effect of any such shifts may be mitigated by forming a predetermined fiducial mark in the substrate. A fiducial mark may also be referred to as a preamble.

A fiducial mark is a group of voxels arranged in a predetermined pattern. Typically, the pattern is a 1-dimensional ("1D") or 2-dimensional ("2D") pattern, though 3D patterns may alternatively be used. The size of the group is not particularly limited, provided that the number of voxels is large enough to allow the pattern to be identified unambiguously when reading the optical data storage medium. By way of illustration, a 2D fiducial mark may be at least 4 voxels wide by 4 voxels high.

When processing images of the optical data storage medium to recover the stored data, the fiducial mark may be identified, positions of the voxels which form the fiducial mark may be determined. Based on the determined positions, corrections may be applied to compensate for positional variations which occurred when writing the voxels and/or any distortions in the image.

The positional information may be used as an input to a processing/decode method for recovering data from the optical data storage medium. The processing/decode method may comprise using a machine learning model.

A fiducial mark may, for example, be arranged along one or more edges of a sector of voxels. Other arrangements are contemplated. For example, a fiducial mark may alternatively or additionally be arranged at the center of a sector.

A sector is a 2-dimensional group of voxels. In many implementations, a given layer of voxels in an optical data storage medium comprises two or more sectors, and is read using a reader having a field of view sized to capture an image comprising one sector in its entirety along with edge portions of up to 8 immediately-adjacent sectors.

The predetermined pattern may be a Barker sequence or a Frank-Zadoff-Chu sequence. Other patterns may be used.

Symbols forming a fiducial mark may be selected so as to maximize contrast between the symbols. This may allow for easier detection of the mark.

Two or more different fiducial marks may be present in a single optical data storage medium. Adjacent sectors may be associated with different fiducial marks. This may allow the sectors to be distinguished from one another more easily.

For example, two different fiducial marks may be used, with the associated sectors being arranged in a chequerboard pattern such that no sector shares an edge with another sector having the same fiducial mark.

Writing a fiducial mark to the optical data storage medium is particularly useful when the optical data storage medium is written using a high-throughput method, such as a method as described with reference to FIG. 2. High-throughput methods can be sensitive to component drift. For example, operating a sample stage at high speed may have a trade-off in positioning accuracy.

An example laser writing system 600 useful for implementing the methods described herein will now be described with reference to FIG. 6. FIG. 6 is a schematic block diagram of the laser writing system 600.

The example laser writing system 600 includes a laser source 610, a first beam splitter 630, a write path 640, and a sample stage 660. The drawing shows the laser writing system 600 during use, with a substrate 620 mounted on the sample stage.

The laser source 610 generates pulses of laser light. Typically, the laser pulses are generated at a constant repetition rate with period $t_p$. By way of illustration, the repetition rate may be of the order of 10 MHz. Laser source 610 may be a femtosecond laser.

Laser source 610 emits the pulses of laser light towards first beam splitter 630. The first beam splitter 630 splits each pulse into two or more beams. Each beam is directed toward a respective write path 640. Dividing the laser light into two or more beams allows for two or more instances of the method described herein to be performed in parallel, e.g. to allow two or more scanlines to be written at the same time.

A single write path 640 is shown in the drawing. Write path 640 includes, in sequence, an intensity modulator 642, a second beam splitter 644, a polarization modulator 646, a scanner 648, and an objective 650.

The intensity modulator 642 receives a laser pulse from first beam splitter 630 and adjusts the intensity of the laser pulse. The strength of a voxel may vary as a function of the amplitude of the laser pulse used to form the voxel, and an intensity modulator may allow this to be adjusted.

The amplitude modulator may comprise an intensity attenuator and/or an amplifier.

An intensity attenuator may, for example, comprise an acousto-optic deflector; a liquid crystal modulator; the combination of an electro-optic modulator and a polarizer; or the combination of a Pockels cell and a polarizer. These are examples of fast amplitude modulators. An amplitude modulator which is capable of pulse-to-pulse energy control is considered "fast".

The intensity modulator 642 may be an acousto-optic deflector or the combination of an electro-optic modulator and a polarizer.

The laser pulse then arrives at second beam splitter 644. The second beam splitter 644 divides the pulse into a seed pulse and a data pulse having different respective intensities, as previously described. The second beam splitter may be an electro-optic deflector, an acousto-optic deflector, or a polarization grating-based beam splitter.

Second beam splitter 644 may alternatively comprise the combination of a passive beam splitter (e.g., selected from a non-polarization sensitive beam-splitter, a polarization sensitive beam-splitter, a diffractive optical element, a spatial light modulator) in combination with an active spatial modulator and an active amplitude modulator.

Figure 7:
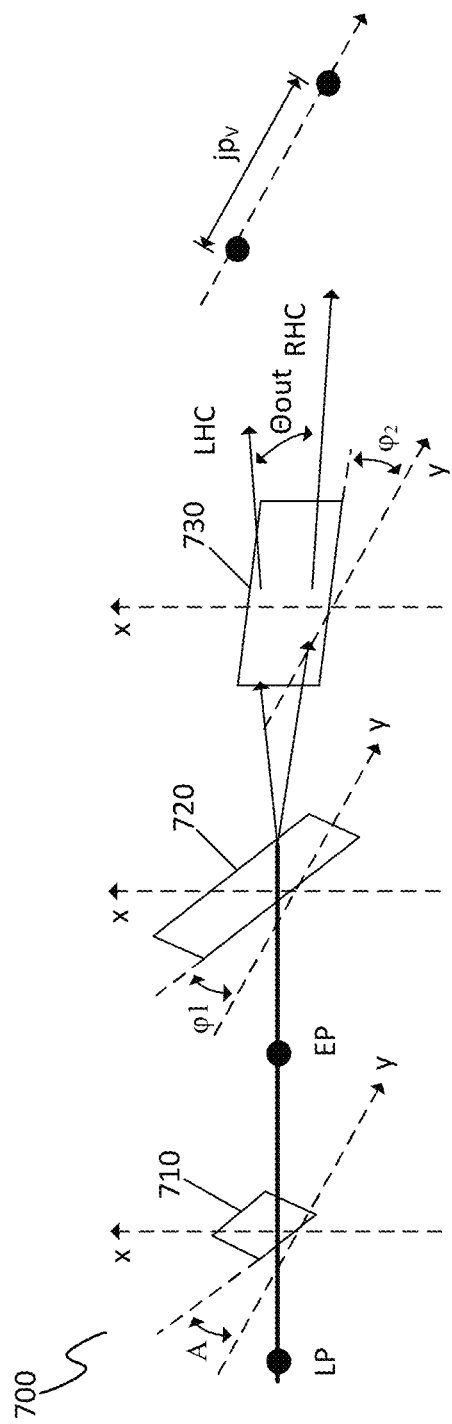
FIG. 7 is an annotated schematic diagram of a polarization grating based-beam splitter.

The second beam splitter 644 is most preferably a beam splitter of the type described below with reference to FIG. 7.

At least the data pulse from second beam splitter 644 passes through a polarization modulator 646. The polarization modulator modulates the polarization of the data pulse at the laser repetition rate.

The polarization modulator 646 may, for example, be a polarization state generator). An example polarization state generator comprises a linear polarizer and a quarter-wave plate arranged in series. Other examples of polarization state generators include Pockels cells; magneto-optic modulators; liquid crystals; rotating prisms; rotating periscopes; and the like.

Since no specific polarization of the seed pulse is required, the seed pulse may pass through the polarization modulator 646 or may alternatively bypass the polarization modulator 646. In implementations where the seed pulse passes through the polarization modulator 636, the polarization modulator 646 modulates the polarization of both the data pulse and the seed pulse.

A scanner 648 is arranged downstream of the polarization modulator 646. Scanner 648 may comprise a spinning polygon mirror, a micro-electromechanical system ("MEMS") mirror, a Galvano scanner an electro-optic scanner, an acousto-optic scanner, or the like.

In implementations where the seed pulse does not pass through the polarization modulator 646, scanner 648 may align the seed pulse and the data pulse.

Scanner 648 deflects the seed pulse and the data pulse. The deflection angle may be swept at a constant speed.

Scanner 648 outputs the seed and data pulses to an objective 650. The objective 650 focusses the seed and data pulses on or in substrate 320 to allow for the formation of voxels, as described with reference to FIG. 2.

The objective 650 may have a variable focal depth or focal position. Voxels may then be written at variable depth positions within the transparent substrate 620 without requiring movement of the transparent substrate in the z direction.

Relay optics may be arranged between the scanner 648 and the objective 660. The relay optics may comprise a scan lens, a spherical lens, and a tube lens.

The laser writing system further comprises a sample stage 650 for holding the substrate 620. The sample stage may be a translation stage which moves the substrate 620 perpendicular to the beam direction and perpendicular to the beam scanning direction.

Various modifications may be made to the example write head.

First beam splitter 620 is optional and may be omitted in implementations where parallelization of the method is not used.

Where parallelization is used, there is no particular upper limit on the number of write paths. Where more than two write paths are to be used, first beam splitter 620 may be replaced by two or more beam splitters arranged in series. By way of illustration, a system may include from 1 to 5 write paths.

In the example, the scanner 648 and objective 650 are components of a write path. Alternatively, scanner 648 and objective 650 may be shared amongst several write paths. In such implementations, beams may be recombined after polarization is modulated.

Intensity modulator 642 is optional and may be omitted.

In principle, a write path may include separate optical components for the seed and data pulses, respectively. It may be advantageous for the seed and data pulses to follow the same optical path, to allow for more accurate control over the distance between the seed and data pulses.

The write head may include one or more additional optical relay components (e.g., one or more lenses) arranged between the second beam splitter 644 and the scanner 648 such that the seed and data pulses arrive at a same region of the scanner.

Scanner 648 may be omitted. The position of the data and seed pulses in the transparent substrate could instead be controlled solely by movement of the sample stage.

The example sample stage is a translation stage. Alternatively or additionally, the sample stage may rotate the transparent substrate.

The illustrated example uses a single laser source to generate both the seed pulse and the data pulse. In other implementations, the seed and data pulse may be generated by respective laser sources. In such implementations, the second beam splitter may be omitted. When two or more laser sources are used, the laser sources may be laser sources of different wavelengths.

An example beam splitter 700 will now be described with reference to FIG. 7. FIG. 7 is an annotated schematic diagram of the beam splitter 700.

The beam splitter 700 comprises a retardation plate 710, a first polarization selective diffractive optic 720, and a second polarization selective diffractive optic 730 arranged in series.

A polarization selective diffractive optic may alternatively be referred to as a "geometric phase optical element" or "geometric phase element".

In this example, the retardation plate 710 is a quarter-wave plate; the first polarization selective diffractive optic 720 is a first polarization grating; and the second polarization selective diffractive optic is a second polarization grating.

The retardation plate 710, the first polarization grating 720, and the second polarization grating 730 are arranged in series.

In use, polarized input light LP (e.g., originating from laser source 610 of laser writing system 600) arrives at quarter-wave plate 710. The input light may be linearly polarized, elliptically polarized, or circularly polarized. For ease of explanation, in the following discussion the input light will be taken to be linearly-polarized light.

When the linearly-polarized light passes through the retardation plate 710, it becomes elliptically-polarized light EP. Arbitrary ellipticities may be obtained by adjusting the angle A of the quarter-wave plate 710.

The elliptically-polarized light EP then arrives at first polarization grating 720. The first polarization grating 720 splits the elliptically-polarized light into a left-circularly polarized beam and a right-circularly polarized beam. The relative amplitudes of the two beams are determined by the ellipticity of the elliptically-polarized light EP. The polarization grating-based beam splitter 700 is thus a convenient means for generating the seed and data pulses of intended amplitude ratio in the method of FIG. 2.

The left-circularly polarized beam and right-circularly polarized beam then arrive a second polarization grating 730. Since the beams are circularly polarized, each beam is deflected in a single direction by the second polarization grating.

The angle $\Theta_{OUT}$ between the beams LHC, RHC may be varied by changing the angle φ1 of the first polarization grating relative to the angle φ2 of the second polarization grating.

In more detail, the angle of deflection may be varied by changing the relative orientation of the grating vectors of the first and second polarization gratings. The splitting angle is minimized when the grating vectors are parallel, and maximized when the grating vectors are anti-parallel.

A mathematical treatment of the beam splitting will now be provided.

An elliptical polarization can be represented by a Jones vector:

$$\begin{pmatrix} E_x \\ E_y \end{pmatrix} = \begin{pmatrix} \cos\chi \\ i\sin\chi \end{pmatrix} \quad \text{(eq. A1.1)}$$

where $\chi$ is the ellipticity.

Right-hand and left-hand circular polarizations are expressed by:

$$\begin{pmatrix} E_x^\pm \\ E_y^\pm \end{pmatrix} = \frac{1}{\sqrt{2}} \begin{pmatrix} 1 \\ \pm i \end{pmatrix} \quad \text{(eq. A1.2)}$$

where + and − are left-hand and right-hand, respectively.

Eq. A1.1 can be expressed as the linear combination of the Jones vectors of two circular polarizations:

$$\begin{pmatrix} E_x \\ E_y \end{pmatrix} = \begin{pmatrix} \cos\chi \\ i\sin\chi \end{pmatrix} = \frac{\cos\chi + \sin\chi}{2}\begin{pmatrix} 1 \\ i \end{pmatrix} + \frac{\cos\chi - \sin\chi}{2}\begin{pmatrix} 1 \\ -i \end{pmatrix} \quad \text{(eq. A1.3)}$$

Using beam splitter 700, the splitting angle may be tuned by varying the relative orientations of the polarization gratings 720, 730.

For illustration, first consider the case where the input light EP is right-circularly polarized light. This light is deflected in only one direction by the first polarization grating 720, and is converted to left-circularly polarized light. The spatial phase change caused by the first polarization grating is:

$$\Delta\phi_{R\to L}^{(1)}(\varphi_1; x, y) = \frac{2\pi}{\lambda}\sin\theta_1(x\cos\varphi_1 + y\sin\varphi_1) \quad \text{(eq. A2.1)}$$

where $\theta_1$ is the deflection angle of the first polarization grating, $\varphi_1$ is the tilt of the grating vector of PG1 from the x axis, and k is the wavelength of the beam.

By symmetry, the second polarization grating 730 causes a phase change of:

$$\Delta\phi_{R\to L}^{(2)}(\varphi_2; x, y) = -\frac{2\pi}{\lambda}\sin\theta_2(x\cos\varphi_2 + y\sin\varphi_2) \quad \text{(eq. A2.2)}$$

where $\theta_2$ is the deflection angle of the second polarization grating, $\varphi_2$ is the tilt of the grating vector of PG2 from the x axis.

The total phase change for right-circularly polarized light passing through the beam splitter is therefore:

$$\Delta\phi_{R\to L\to R}^{(1+2)}(\varphi_1, \varphi_2; x, y) = \frac{2\pi}{\lambda}[x(\sin\theta_1\cos\varphi_1 - \sin\theta_2\cos\varphi_2) + y(\sin\theta_1\sin\varphi_1 - \sin\theta_2\sin\varphi_2)] \quad \text{(eq. A2.3)}$$

When the deflection angles by two PGs are the same ($\theta=\theta_1=\theta_2$), then equation A2.3 can be simplified to $$\Delta\phi^{(1+2)}_{R\to L\to R}(\varphi_1, \varphi_2; x, y) = \qquad \text{(eq. A2.4)}$$
$$\frac{4\pi}{\lambda}\sin\theta\sin\left(\frac{\varphi_1-\varphi_2}{2}\right)\left[-x\sin\left(\frac{\varphi_1+\varphi_2}{2}\right)+y\cos\left(\frac{\varphi_1+\varphi_2}{2}\right)\right].$$

The overall phase change for left-circularly polarized light passing through the beam splitter is:

$$\Delta\phi^{(1+2)}_{L\to R\to L}(\varphi_1, \varphi_2; x, y) = \qquad \text{(eq. A2.5)}$$
$$-\frac{4\pi}{\lambda}\sin\theta\sin\left(\frac{\varphi_1-\varphi_2}{2}\right)\left[-x\sin\left(\frac{\varphi_1+\varphi_2}{2}\right)+y\cos\left(\frac{\varphi_1+\varphi_2}{2}\right)\right].$$

Elliptically-polarized light can be treated as a combination of left- and right-circularly polarized light. According to eq. A1.3, an elliptical polarization of the ellipticity at $\chi$ has two circular polarizations with the energy ratio of:

$$(\cos\chi-\sin\chi)^2:(\cos\chi+\sin\chi)^2 \qquad \text{(eq. A2.6).}$$

Therefore, the left- and right-circularly polarized components experience different phase changes (eqs. A2.4 and A2.5). These phase changes result in the light being split at an angle of:

$$\Theta(\varphi_1, \varphi_2) = 2\sin^{-1}\left[2\sin\theta\sin\left(\frac{\varphi_1-\varphi_2}{2}\right)\right] \qquad \text{(eq. A2.7)}$$

With the tilt of the split plane from the xy plane being:

$$\Phi(\varphi_1, \varphi_2) = \frac{\varphi_1+\varphi_2}{2}. \qquad \text{(eq. A2.8)}$$

Eq. A2.7 and eq. A2.8 suggest respectively that the split angle may be varied from 0 to about 4θ by changing the relative orientation between the two polarization gratings (φ1-φ2) from 0 degree (parallel) to 180 degrees (anti-parallel), with the split plane being determined by the sum of the orientations (φ1+φ2). In addition, eq. A2.6 means that the amplitude ratio of the two beams may be varied by varying the ellipticity of the input light.

Various modifications may be made to the described polarization grating-based beam splitter.

For example, the quarter-wave plate 710 may be replaced by a waveplate of different retardance, for example, a one third wave plate. A one third wave plate may provide a smaller ratio between the amplitudes of the beams output by the beam splitter.

As alternatives to polarization gratings, polarization holograms or polarization lenses may be used. For example, when the polarization gratings are replaced by polarization lenses, the splitter may generate two beams of different divergence. Beams of different divergence may be combined, e.g. using focusing optics 650 of laser writing system 600, to generate a multi-focus beam (in other words, two focused beams which are in the direction of propagation of the light).

Two or more beam splitters of the type described may be arranged in series, to generate multiple beams of variable propagation directions and variable amplitude ratios.

Example 1

A layer of birefringent voxels was written to a silica glass medium using the method of FIG. 2.

Writing was performed using a laser writing system of the type described with reference to FIG. 6. The laser light source of the laser writing system was a femtosecond laser. The polarization modulator was synchronized with the laser. The laser writing system further included a high speed beam scanner, an XYZ translation stages, fast attenuator, and beam-splitter.

Data were encoded into 8 polarization azimuth values i.e., 3 bits per voxel. Each voxel was written using one seed pulse and one data pulse at an intensity ratio of approximately 0.6 to 0.7.

The lateral pitch was approximately 0.5×0.5 microns. The spatial separation between the seed and data beams inside the medium was approximately 2 microns. The beam scan velocity was approximately 5 m/s inside the medium.

A peak throughput per beamline of approximately 10 million voxels per second was achieved.

Example 2

Two types of optical data storage voxels were written using a comparative hot-writing method as described in Lei et al., Optica Vol. 8, Issue 11, pp. 1365-1371 (2021) and a method in accordance with FIG. 2, respectively. Scanning electron microscopy images of voxels in the media are shown in FIGS. 8A and 8B, respectively.

Figure 8A:
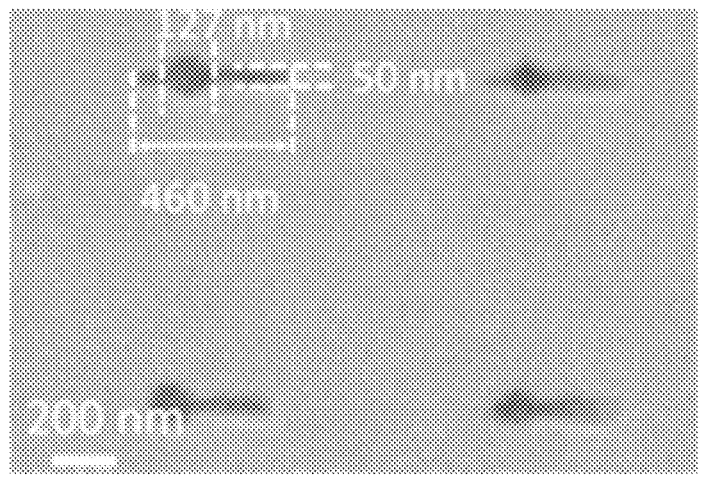
FIG. 8A is a scanning electron microscopy, SEM, image of voxels obtained by a comparative process.
Figure 8B:
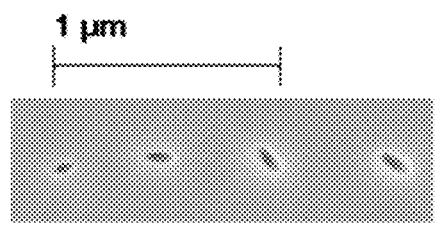
FIG. 8B is an SEM image of voxels obtained by a method in accordance with FIG. 2.

Voxels obtained by the comparative method were found to comprise a central bulge and asymmetric elongate cracks on either side of the central bulge (FIG. 8A). In contrast, voxels obtained by the method of FIG. 2 had an elliptical shape (FIG. 8B).

Without wishing to be bound by theory, it is believed that the difference in shape may be the result of improved alignment between the seed and data pulses achieved by the method of FIG. 2. The asymmetry of the voxels obtained using the comparative hot writing method is believed to be the result of the seed and data pulses arriving at slightly different positions, which is unavoidable in a hot-writing process.

Example 3

Data were written to optical storage media using the cold-writing approach. Varying numbers of data pulses per voxel were used. The storage capacity of the media in bits per voxel was measured. The results are shown in FIG. 9.

Figure 9:
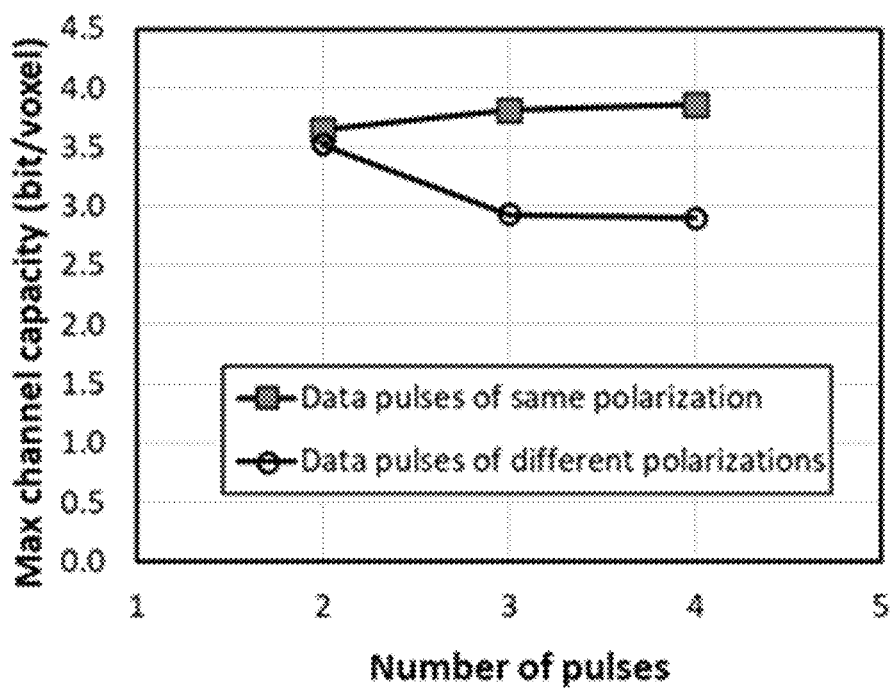
FIG. 9 is a plot of data capacity versus number of laser light pulses per voxel.

A difference in polarization between the seed pulse and the data pulse was found to have no significant impact on voxel quality (FIG. 9, two leftmost data points). The azimuth of the birefringent voxels was determined by the polarization of the data pulse(s), and was not sensitive to the polarization of the seed pulse.

Where more than one data pulse per voxel was used i.e., the total number of pulses per voxel was greater than 2, a marginal improvement in quality was observed when all data pulses had the same polarization. The improvement was not large enough to be significant. Quality was reduced when the multiple data pulses had different polarizations.

FIG. 9 therefore demonstrates that the quality of a birefringent voxel is unaffected by the seed polarization, and that there is no meaningful benefit in using more than one data pulse per voxel.

Example 4

The effect of walk-off distance on data capacity per voxel was investigated for a comparative cold-writing process, and for a process in accordance with FIG. 2.

Figure 10A:
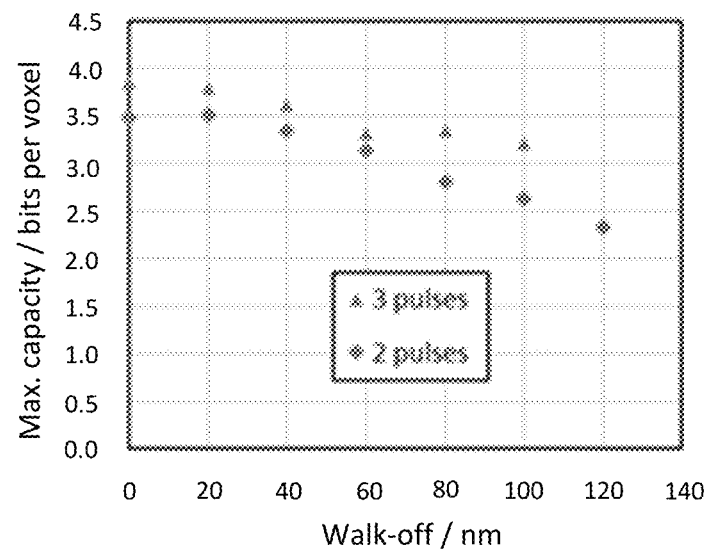
FIG. 10A is a plot of data capacity as a function of walk-off distance in a comparative method.

A walk-off of more than ±20 nm was found to cause observable degradation of the birefringent voxels in a cold writing process (FIG. 10A).

Figure 10B:
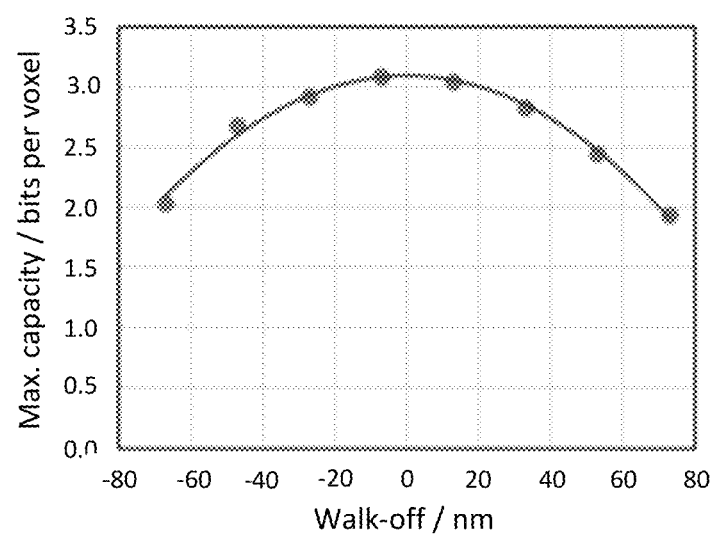
FIG. 10B is a plot of data capacity as a function of walk-off distance in a method according to FIG. 2.

A similar effect was observed when using a process in accordance with FIG. 2 (FIG. 10B) when the seed and data pulses were separated by non-integer multiples of the voxel pitch.

The results demonstrate that the spacing between the seed and data pulses is most preferably set to an integer multiple of the voxel pitch, to minimize the walk-off distance and thereby maximize data capacity.

Example 5

A beam splitter of the type described with reference to FIG. 7 was constructed. In the example device, both polarization gratings had the same grating period.

Figure 11:
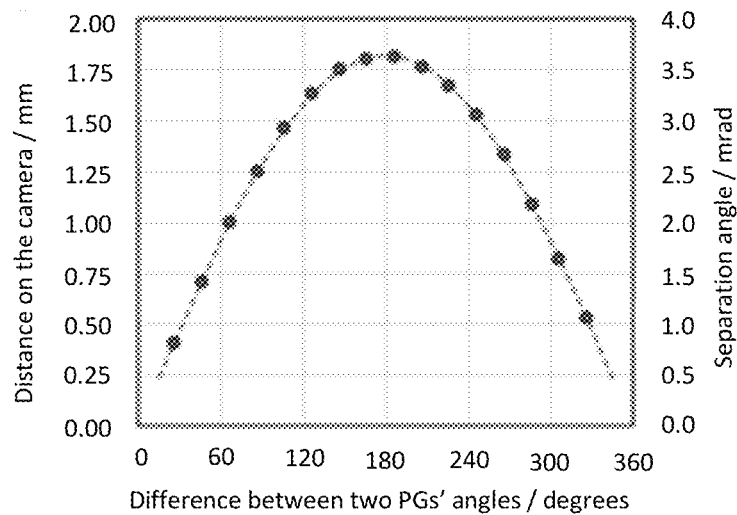
FIG. 11 is a plot of beam separation angle as a function of angle between the two polarization gratings of a beam splitter in accordance with FIG. 7.

The orientations of the polarization gratings ("PG") were varied. More specifically, the difference between the orientations ($\varphi_{PG1} - \varphi_{PG2}$) was varied, while keeping their sum the same ($\varphi_{PG1} + \varphi_{PG2}$=const.). The distance between the two output beams was monitored using a beam profiler. Separation angles were calculated based on the measured distances. The results are shown in FIG. 11.

The maximum separation angle in this measurement was 3.7 mrad, which was double the separation angle achieved using a single PG. The separation angle followed the equation:

$$\Theta(\varphi_{PG1}, \varphi_{PG2}) = 2\left|\sin^{-1}\left[2\sin\theta_0 \cos\left(\frac{\varphi_{PG1} - \varphi_{PG2}}{2}\right)\right]\right| \quad \text{(eq. 2.1)}$$

where $2\theta_0$ is the separation angle of two different circular polarizations by a single PG.

Figure 12:
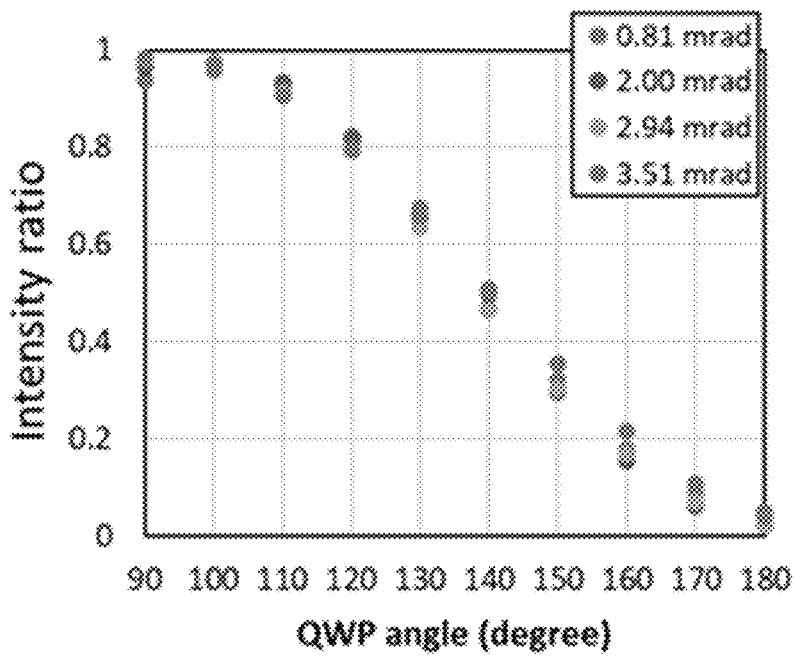
FIG. 12 is a plot of the ratio of intensities of two beams output by a beam splitter in accordance with FIG. 7 as a function of angle of the quarter-wave plate.

Further experiments were performed to demonstrate that the relative amplitudes of the two beams output by the beam splitter can be varied by adjusting the angle of the quarter-wave plate ("QWP"). Linearly-polarized light was used as the input. Results are shown in FIG. 12.

It was found that when the polarization before the QWP is linear, the intensity ratio follows the sine of the angle of the QWP:

$$\frac{I_{LHCP}}{I_{LHCP} + I_{RHCP}} = |\sin(\theta_{QWP})|^2. \quad \text{(eq. 2.2)}$$

where $\theta_{QHP}$ is the orientation of the QWP and the angle of the input polarization is 45 degrees, i.e. the polarization after the QWP is RHCP at $\theta_{QHP}=0°, 180°$.

It will be appreciated that the above embodiments have been described by way of example only.

More generally, according to one aspect disclosed herein, there is provided a method of forming a birefringent voxel in a transparent substrate. The method comprises steps of:

i) simultaneously generating a first seed pulse and a first data pulse, the first seed pulse and the first data pulse being spatially-separated laser pulses, the first seed pulse having an amplitude which is different from an amplitude of the first data pulse;

ii) focusing the first seed pulse at a first seed location in a substrate and focusing the data pulse at a first data location in the substrate, the first seed location and the first data location being separated by a predetermined distance along a scan path, with the first seed location being ahead of the first data location in the scan path; and iii) subsequent to steps i) and ii), simultaneously generating a second seed pulse and a second data pulse, the second seed pulse and the second data pulse being spatially-separated laser pulses, the second seed pulse having an amplitude which is different from an amplitude of the second data pulse;

iv) focusing the second seed pulse at a second seed location in the substrate and focusing the data pulse at a second data location in the substrate, the second seed location being separated from the second data location by the predetermined distance along the scan path, the second seed location being ahead of the first seed location and the second data location in the scan path, and wherein the second data location is the same as the first seed location resulting in formation of a birefringent voxel.

A related method comprises steps of:

i) simultaneously generating a seed pulse and a data pulse, the seed pulse and the data pulse being spatially-separated laser pulses, and the seed pulse having an amplitude which is different from an amplitude of the data pulse;

ii) focusing the seed pulse and the data pulse at respective locations in a substrate, the locations being separated by a predetermined distance along a scan path, with the location of the seed pulse being ahead of the location of the data pulse in the scan path; and iii) iterating steps i) and ii), wherein the locations of the seed pulse and the data pulse are incremented along the scan path between iterations, the location of the seed pulse in an earlier iteration being the same as the location of the data pulse in a later iteration resulting in formation of a birefringent voxel at that location. It will be appreciated that the various optional features described below may be incorporated into implementations of either method.

Typically, the amplitude of the seed pulse is greater than the amplitude of the data pulse.

The substrate may be a transparent substrate. By "transparent" is meant transparent to light at the wavelength(s) of the seed pulse and data pulses. When the substrate is a transparent substrate, the locations of the seed and data pulses may be within a body of the substrate or at a surface of the substrate.

Alternatively, the substrate may be an opaque substrate. In such implementations, the locations are at a surface of the substrate.

Generating the seed pulse and the data pulse may comprise generating a source laser pulse and splitting the source laser pulse using a beam splitter. This may allow for more efficient utilization of the laser.

Alternatively, the seed pulse and data pulse may be generated by respective laser sources. This may allow the seed pulse and data pulse to have different wavelengths.

The beam splitter may comprise a retardation plate; a first polarization selective diffractive optic downstream of the retardation plate along an optical path; and a second polarization selective diffractive optic downstream of the first polarization selective diffractive optic along the optical path.

Such a beam splitter may allow for control of the amplitudes of the source and data pulses as well as the predetermined distance.

The retardation plate may be a quarter-wave plate.

Examples of polarization selective diffractive optics include a polarization grating, a polarization hologram, and a polarization lens. The first and second polarization selective diffractive optics may be the same or different. In particular, the first polarizer may be a first polarization grating and the second polarizer may be a second polarization grating.

The locations of the seed pulse and the data pulse may be incremented by a non-zero integer divisor of the predetermined distance between iterations. In other words, the locations of the seed pulse and data pulse may be incremented by a non-zero integer multiple of the voxel pitch. This may allow for more reliable alignment of the data pulse of the later iteration with the seed pulse of the earlier iteration.

The non-zero integer divisor may, for example, be at least 2. Varying the spacing between the seed pulse and the data pulse varies the time delay between arrival of a seed pulse and arrival of a data pulse at any given location. Providing such a time delay may avoid thermal damage to the transparent substrate.

The predetermined distance may be greater than or equal to double a wavelength of the seed pulse and the data pulse. This may reduce or avoid cross-talk between the seed pulse and data pulse. Smaller predetermined distances may be used.

The method may further comprise modulating polarization of the data pulses. In other words, the polarizations of the data pulses of different iterations may be different. Modulating polarization may allow higher-density storage of data, as each different polarization may represent a different data symbol.

The seed pulse and the data pulse may share a common path through scanning and delivery optics. This may allow for more reliable positioning of the seed pulse and data pulse.

Iterating steps i) and ii) may result in formation of a plurality of birefringent voxels, with the plurality of birefringent voxels representing a fiducial mark. The fiducial mark is most typically a 1-dimensional or 2-dimensional fiducial mark, though 3-dimensional fiducial marks may be used. The fiducial mark may be recognized by a reader when recovering data from the optical data storage medium formed by the method. This may allow the reader to compensate for positional inaccuracies during the write process.

The method may be parallelized. Two or more instances of the method may be performed simultaneously. Two or more instances of steps i) and ii) may be performed simultaneously in parallel. This may improve throughput.

Another aspect provides an optical data storage medium obtainable by the method. As explained herein with reference to FIGS. 8A and 8B, voxels written by the present method have a different structure to voxels produced by a comparative hot-writing process.

The optical data storage medium may be a transparent optical data storage medium comprising a transparent substrate and a birefringent voxel embedded in the transparent substrate. The birefringent voxel may be in the form of an elliptical void having a diameter, as measured along the semi-major axis of the ellipse, in the range 1 to 200 nm, optionally 50 to 200 nm.

The optical data storage medium may comprise voxels arranged in a scanline. A first end region of the scanline may comprise at least one weak modification, obtainable by applying a data pulse to a blank region of the substrate. A second end region of the scanline may comprise one or more non-birefringent seed modifications. A data encoding region comprising one or more birefringent voxels may be arranged between the first and second end regions.

The optical data storage medium may comprise a layer of two or more such scanlines. A pitch between voxels within a scanline may be different from a pitch between adjacent scanlines.

The optical data storage medium may comprise two or more such layers, arranged in a stack. The number of layers is not particularly limited provided that data are recoverable by an appropriate read system. By way of illustration, the optical data storage medium may include from 2 to 100 layers or more of birefringent voxels.

The optical data storage medium may include a plurality of birefringent voxels arranged as a fiducial mark, optionally a two-dimensional fiducial mark. The two-dimensional fiducial mark may be used to aid in recovering data encoded by the voxels. For example, positions of voxels in the two-dimensional fiducial mark may be used to determine one or more correction parameters for compensating for errors in the positioning of voxels.

The birefringent voxels may be arranged in a plurality of sectors. Each sector may be associated with a respective fiducial mark, for example arranged at an edge of the sector.

The transparent substrate may be a glass substrate, optionally a silica glass substrate or quartz glass substrate. Glass has excellent chemical, thermal and physical stability, allowing for very long-term storage of data.

Another aspect provides a laser writing system useful for implementing the method. The laser writing system comprises a laser source for emitting a laser pulse; and a write path for receiving an input laser pulse originating from the laser source and focusing seed and data pulses at respective locations in a substrate.

A write path comprises a beam splitter for splitting a laser pulse into a seed pulse and a data pulse, the seed pulse and the data pulse being spatially-separated, the seed pulse having an amplitude which is different from (e.g., greater than) an amplitude of the data pulse; and an objective for focusing the seed pulse and the data pulse at different respective locations in a substrate, the objective being downstream of the beam splitter on the optical path.

A write path may further comprise a scanning optic, e.g. arranged between the beam splitter and the objective. The scanning optic may vary the locations of the seed and data pulses.

The laser writing system may further comprise, or be operably linked to, a controller configured to control the write head to perform a method as described herein. The nature of the controller is not particularly limited.

The controller may comprise dedicated hardware circuitry, e.g. an application-specific integrated circuit, ASIC. The controller may comprise one or more processors and a non-transitory computer readable data storage, the data storage storing instructions which, when executed by the processor, cause the write head to perform a method as described herein. A combination of dedicated hardware circuitry and one or more processors may be used.

The beam splitter may comprise a retardation plate; a first polarization selective diffractive optic downstream of the retardation plate along the optical path; and a second polarization selective diffractive optic downstream of the first polarization selective diffractive optic along the optical path. Such a beam splitter provides a convenient means for generating seed and data pulses having respective different amplitudes and a predetermined spacing.

The retardation plate may be a quarter-wave plate.

Examples of polarization selective diffractive optics include a polarization grating, a polarization hologram, and a polarization lens. The first and second polarization selective diffractive optics may be the same or different. In particular, the first polarization selective diffractive optic may be a first polarization grating and the second polarization selective diffractive optic may be a second polarization grating.

The beam splitter may be configured to allow for relative rotation of the first and second polarization selective diffractive optics. This may allow control over spacing between the seed and data pulses.

The retardation plate may be adjustable. Adjusting the retardation plate may vary the ellipticity of light arriving at the first polarization selective diffractive optic, and in turn vary the ratio of the amplitudes of the seed and data pulses.

The laser writing system may further comprise a polarization modulator for modulating polarization of the data pulse. Modulating the polarization of the data pulse allows for voxels with different birefringence to be written to a transparent substrate. Differences in birefringence (e.g., azimuth) may be used to encode data.

The laser writing system may include two or more write paths. Providing two or more write paths may allow two or more instances of the method provided herein to be performed simultaneously.

For example, the laser writing system may include a further beam splitter, arranged downstream of the laser source and upstream of the write paths. The second beam splitter may provide an input pulse to each of the two or more write paths.

Another example laser writing system comprises a pulsed laser source; a beam splitter arranged downstream of the pulsed laser source along an optical path; and a focusing optic downstream of the beam splitter on the optical path. As will be appreciated, this laser writing system may include any of the features of the previously-described system. For example, the beam splitter may comprise a retardation plate; a first polarization selective diffractive optic downstream of the quarter-wave plate along the optical path; and a second polarization selective diffractive optic downstream of the first polarization selective diffractive optic along the optical path.

In another aspect, there is provided a beam splitter. The beam splitter comprises a retardation plate; a first polarization selective diffractive optic downstream of the retardation plate along an optical path; and a second polarization selective diffractive optic downstream of the first polarization selective diffractive optic along the optical path. The beam splitter is useful for splitting a beam of polarized light. As explained hereinabove, such a beam splitter allows for control over both relative amplitudes and angular spacing of the split beams.

The retardation plate may be a quarter-wave plate.

Examples of polarization selective diffractive optics include a polarization grating, a polarization hologram, and a polarization lens. The first and second polarization selective diffractive optics may be the same or different. In particular, the first polarization selective diffractive optic may be a first polarization grating and the second polarization selective diffractive optic may be a second polarization grating.

The first and second polarization selective diffractive optic may be rotatable with respect to one another. This may allow for the angular spacing between the split beams to be varied.

The retardation plate may be adjustable, e.g. rotatable. Adjusting the retardation plate may adjust ellipticity of polarized light arriving at the first polarization selective diffractive optic, in turn varying the relative amplitudes of the split beams produced by the beam splitter.

The present disclosure provides the following Clauses:

Clause 1. A method, comprising:
  simultaneously generating a first seed pulse and a first data pulse, the first seed pulse and the first data pulse being spatially-separated laser pulses, and an amplitude of the first seed pulse being different from an amplitude of the first data pulse;
  focusing the first seed pulse at a first seed location in a substrate and focusing the data pulse at a first data location in the substrate, the first seed location and the first data location being separated by a predetermined distance along a scan path, with the first seed location being ahead of the first data location in the scan path;
  subsequent to focusing the first seed pulse at the first seed location and focusing the data pulse at the first data location, simultaneously generating a second seed pulse and a second data pulse, the second seed pulse and the second data pulse being spatially-separated laser pulses, and an amplitude of the second seed pulse being different from an amplitude of the second data pulse; and
  focusing the second seed pulse at a second seed location in the substrate and focusing the data pulse at a second data location in the substrate, the second seed location being separated from the second data location by the predetermined distance along the scan path, the second seed location being ahead of the first seed location and the second data location in the scan path, and wherein the second data location is the same as the first seed location resulting in formation of a birefringent voxel.

Clause 2. The method according to Clause 1, wherein the amplitude of the first seed pulse is greater than the amplitude of the first data pulse.

Clause 3. The method according to Clause 1 or Clause 2, wherein the substrate is a transparent substrate.

Clause 4. The method according to any preceding Clause, wherein generating the first seed pulse and the first data pulse comprises generating a source laser pulse and splitting the source laser pulse using a beam splitter.

Clause 5. The method according to Clause 4, wherein the beam splitter comprises: a retardation plate;
  a first polarization selective diffractive optic downstream of the retardation plate along an optical path; and
  a second polarization selective diffractive optic downstream of the first polarization selective diffractive optic along the optical path.

Clause 6. The method according to Clause 5, wherein the retardation plate is a quarter-wave plate.

Clause 7. The method according to Clause 5 or Clause 6, wherein the first and second polarization selective diffractive optics are each independently selected from a polarization grating, a polarization hologram, and a polarization lens.

Clause 8. The method according to any preceding Clause, further comprising, subsequent to focusing the first seed pulse at the first seed location and focusing the data pulse at the first data location and prior to focusing the second seed pulse at the second seed location and focusing the data pulse at the second data location:

performing at least one iteration of:
- a) simultaneously generating an intermediate seed pulse and an intermediate data pulse, the intermediate seed pulse and the intermediate data pulse being spatially-separated laser pulses of different amplitudes;
- b) focusing the intermediate seed pulse and intermediate data pulse at an intermediate seed and data locations in the substrate respectively, the intermediate seed and data locations being separated by the predetermined distance and the intermediate seed location being ahead of the intermediate data location in the scan path.

Clause 9. The method according to Clause 8, wherein adjacent seed locations are separated by a non-zero integer divisor of the predetermined distance between iterations.

Clause 10. The method according to Clause 9, wherein the non-zero integer divisor is at least 2.

Clause 11. The method according to any preceding Clause, wherein the predetermined distance is greater than or equal to double a wavelength of the seed pulse and the data pulse.

Clause 12. The method according to any preceding Clause, further comprising modulating polarization of the first and second data pulses.

Clause 13. The method according to any preceding Clause, wherein the first seed pulse and the first data pulse share a common path through scanning and delivery optics.

Clause 14. The method according to any preceding Clause, further comprising:
simultaneously to generating the first seed pulse and first data pulse, generating a third seed pulse and a third data pulse the third seed pulse and the third data pulse being spatially-separated laser pulses, and an amplitude of the third seed pulse being different from an amplitude of the third data pulse;
simultaneously to focusing the first seed pulse at the first seed location and focusing the first data pulse at the first data location, focusing the third seed pulse at a third seed location in the substrate and focusing the third seed pulse at a third seed location in the substrate the third seed location and the third data location being separated by a predetermined distance along a further scan path, with the third seed location being ahead of the third data location on a further scan path.

Clause 15. A method, comprising steps of:
- i) simultaneously generating a seed pulse and a data pulse, the seed pulse and the data pulse being spatially-separated laser pulses, and the seed pulse having an amplitude which is different from an amplitude of the data pulse;
- ii) focusing the seed pulse and the data pulse at respective locations in a substrate, the locations being separated by a predetermined distance along a scan path, with the location of the seed pulse being ahead of the location of the data pulse in the scan path; and
- iii) iterating steps i) and ii), wherein the locations of the seed pulse and the data pulse are incremented along the scan path between iterations, the location of the seed pulse of an earlier iteration being the same as location of the data pulse of a later iteration resulting in formation of a birefringent voxel at that location.

Clause 16. The method according to Clause 15, wherein the amplitude of the seed pulse is greater than the amplitude of the data pulse.

Clause 17. The method according to Clause 15 or Clause 16, wherein the substrate is a transparent substrate.

Clause 18. The method according to any of Clauses 15 to 17, wherein generating the seed pulse and the data pulse comprises generating a source laser pulse and splitting the source laser pulse using a beam splitter.

Clause 19. The method according to Clause 18, wherein the beam splitter comprises:
a retardation plate;
a first polarization selective diffractive optic downstream of the retardation plate along an optical path; and
a second polarization selective diffractive optic downstream of the first polarization selective diffractive optic along the optical path.

Clause 20. The method according to Clause 19, wherein the retardation plate is a quarter-wave plate.

Clause 21. The method according to Clause 19 or Clause 20, wherein the first and second polarization selective diffractive optics are each independently selected from a polarization grating, a polarization hologram, and a polarization lens.

Clause 22. The method according to any of Clauses 15 to 21, wherein the locations of the seed pulse and the data pulse are incremented by a non-zero integer divisor of the predetermined distance between iterations.

Clause 23. The method according to Clause 22, wherein the non-zero integer divisor is at least 2.

Clause 24. The method according to any of Clauses 15 to 23, wherein the predetermined distance is greater than or equal to double a wavelength of the seed pulse and the data pulse.

Clause 25. The method according to any of Clauses 15 to 24, further comprising modulating polarization of the data pulses.

Clause 26. The method according to any of Clauses 15 to 25, wherein the seed pulse and the data pulse share a common path through scanning and delivery optics.

Clause 27. The method according to any of Clauses 15 to 26, wherein iterating steps i) and ii) results in formation of a plurality of birefringent voxels, the plurality of birefringent voxels representing a fiducial mark.

Clause 28. The method according to any of Clauses 15 to 27, wherein two or more instances of steps i) and ii) are performed simultaneously in parallel.

Clause 29. An optical data storage medium obtainable by the method of any preceding Clause.

Clause 30. The optical data storage medium according to Clause 29, comprising:
a transparent substrate; and
a birefringent voxel embedded in the transparent substrate;
wherein the birefringent voxel is in the form of an elliptical void having a semi-major axis with a diameter in the range 1 to 200 nm.

Clause 31. The optical data storage medium according to Clause 30, wherein the transparent substrate is a glass substrate.

Clause 32. The optical data storage medium according to Clause 30 or Clause 31, which includes a plurality of layers of birefringent voxels.

Clause 33. The optical data storage medium according to any of Clauses 30 to 32, which includes a plurality of birefringent voxels arranged as a fiducial mark.

Clause 34. The transparent optical data storage medium according to Clause 33, wherein the fiducial mark is a two-dimensional fiducial mark.

Clause 35. A laser writing system, comprising:
a laser source for emitting a laser pulse; and
a write path for receiving an input laser pulse from the laser source and focusing seed and data pulses at respective locations in a substrate;
wherein a write path comprises:
a beam splitter for splitting the input pulse into a seed pulse and a data pulse, the seed pulse and the data pulse being spatially-separated, the seed pulse having an amplitude which is different from an amplitude of the data pulse; and
an objective for focusing the seed pulse and the data pulse at different respective locations in a transparent substrate, the objective being downstream of the beam splitter on the write path.

Clause 36. The laser writing system according to Clause 35, wherein the beam splitter is configured to split the input pulse into a seed pulse and a data pulse, the seed pulse having an amplitude which is greater than an amplitude of the data pulse.

Clause 37. The laser writing system according to Clause 35 or Clause 36, further comprising a scanning optic for varying the locations of the seed and data pulses.

Clause 38. The laser writing system according to any of Clauses 35 to 37, wherein the beam splitter comprises:
a retardation plate;
a first polarization selective diffractive optic downstream of the quarter-wave plate along the optical path; and
a second polarization selective diffractive optic downstream of the first polarization selective diffractive optic along the optical path.

Clause 39. The laser writing system according to Clause 38, wherein the retardation plate is a quarter-wave plate.

Clause 40. The laser writing system according to Clause 38 or Clause 39, wherein the first and second polarization selective diffractive optics are each independently selected from a polarization grating, a polarization hologram, and a polarization lens.

Clause 41. The laser writing system according to any of Clauses 38 to 40, wherein the first and second polarization selective diffractive optics are rotatable with respect to one another.

Clause 42. The laser writing system according to any of Clauses 38 to 41, further comprising a polarization modulator for modulating polarization of the data pulse.

Clause 43. The write head according to any of Clauses 38 to 42, which includes two or more write paths and a beam splitter arranged between the laser source and the two or more write paths, the beam splitter being configured to split the laser pulse to generate an input pulse for each write path.

Clause 44. A beam splitter comprising:
a retardation plate;
a first polarization selective diffractive optic downstream of the retardation plate along an optical path; and
a second polarization selective diffractive optic downstream of the first polarization selective diffractive optic along the optical path.

Clause 45. The beam splitter according to Clause 44, wherein the retardation plate is a quarter-wave plate.

Clause 46. The beam splitter according to Clause 44 or Clause 45, wherein the first and second polarization selective diffractive optics are each independently selected from a polarization grating, a polarization hologram, and a polarization lens.

Clause 47. The beam splitter according to any of Clauses 44 to 46, which is configured to allow for relative rotation of the retardation plate, the first polarization selective diffractive optic, and the second polarization selective diffractive optic.

Clause 48. A laser writing system, comprising:
a pulsed laser source;
a beam splitter arranged downstream of the pulsed laser source along an optical path, the beam splitter comprising:
a retardation plate;
a first polarization selective diffractive optic downstream of the quarter-wave plate along the optical path; and
a second polarization selective diffractive optic downstream of the first polarization selective diffractive optic along the optical path; and
the laser writing system further comprising a focusing optic downstream of the beam splitter on the optical path.

49. The laser writing system according to Clause 48, wherein the first and second polarization selective diffractive optics are each independently selected from a polarization grating, a polarization hologram, and a polarization lens.

50. The laser writing system according to Clause 48 or Clause 49, wherein at least one of the retardation plate, the first polarization selective diffractive optic, and the second polarization selective diffractive optic is rotatably mounted.

Other variants or use cases of the disclosed techniques may become apparent to the person skilled in the art once given the disclosure herein. The scope of the disclosure is not limited by the described embodiments but only by the accompanying claims.

The invention claimed is:

1. A method, comprising:
simultaneously generating a first seed pulse and a first data pulse, the first seed pulse and the first data pulse being spatially-separated laser pulses, and an amplitude of the first seed pulse being different from an amplitude of the first data pulse;
focusing the first seed pulse at a first seed location in a substrate and focusing the first data pulse at a first data location in the substrate, the first seed location and the first data location being separated by a predetermined distance along a scan path, with the first seed location being ahead of the first data location in the scan path;
subsequent to focusing the first seed pulse at the first seed location and focusing the data pulse at the first data location, simultaneously generating a second seed pulse and a second data pulse, the second seed pulse and the second data pulse being spatially-separated laser pulses, and an amplitude of the second seed pulse being different from an amplitude of the second data pulse; and focusing the second seed pulse at a second seed location in the substrate and focusing the second data pulse at a second data location in the substrate, the second seed location being separated from the second data location by the predetermined distance along the scan path, the second seed location being ahead of the first seed location and the second data location in the scan path, and wherein the second data location is the same as the first seed location resulting in formation of a birefringent voxel.

2. The method according to claim 1, wherein the amplitude of the first seed pulse is greater than the amplitude of the first data pulse.

3. The method according to claim 1, wherein the substrate is a transparent substrate.

4. The method according to claim 1, wherein generating the first seed pulse and the first data pulse comprises generating a source laser pulse and splitting the source laser pulse using a beam splitter.

5. The method according to claim 4, wherein the beam splitter comprises:
a retardation plate;
a first polarization selective diffractive optic downstream of the retardation plate along an optical path; and
a second polarization selective diffractive optic downstream of the first polarization selective diffractive optic along the optical path.

6. The method according to claim 5, wherein the retardation plate is a quarter-wave plate.

7. The method according to claim 5, wherein the first polarization selective diffractive optic comprises one of a polarization grating, a polarization hologram, or a polarization lens; and wherein the second polarization selective diffractive optic comprises one of a polarization grating, a polarization hologram, or a polarization lens.

8. The method according to claim 1, further comprising, subsequent to focusing the first seed pulse at the first seed location and focusing the first data pulse at the first data location and prior to focusing the second seed pulse at the second seed location and focusing the second data pulse at the second data location:
performing at least one iteration of:
simultaneously generating an intermediate seed pulse and an intermediate data pulse, the intermediate seed pulse and the intermediate data pulse being spatially-separated laser pulses of different amplitudes;
focusing the intermediate seed pulse and intermediate data pulse at an intermediate seed and data locations in the substrate respectively, the intermediate seed and data locations being separated by the predetermined distance and the intermediate seed location being ahead of the intermediate data location in the scan path.

9. The method according to claim 8, wherein adjacent seed locations are separated by a non-zero integer divisor of the predetermined distance.

10. The method according to claim 9, wherein the non-zero integer divisor is at least 2.

11. The method according to claim 1, wherein the predetermined distance is greater than or equal to double a wavelength of the first seed pulse and the first data pulse.

12. The method according to claim 1, further comprising modulating polarization of the first and second data pulses.

13. The method according to claim 1, wherein the first seed pulse and the first data pulse share a common path through scanning and delivery optics.

14. The method according to claim 1, further comprising:
simultaneously to generating the first seed pulse and first data pulse, generating a third seed pulse and a third data pulse the third seed pulse and the third data pulse being spatially-separated laser pulses, and an amplitude of the third seed pulse being different from an amplitude of the third data pulse;
simultaneously to focusing the first seed pulse at the first seed location and focusing the first data pulse at the first data location, focusing the third seed pulse at a third seed location in the substrate and focusing the third seed pulse at a third seed location in the substrate the third seed location and the third data location being separated by a predetermined distance along a further scan path, with the third seed location being ahead of the third data location on the further scan path.

15. An optical data storage medium, comprising:
a transparent substrate; and
a birefringent voxel embedded in the transparent substrate;
wherein the birefringent voxel is in the form of an elliptical void having a semi-major axis with a diameter substantially in the range 1 to 200 nm, and wherein the birefringent voxel is separated from one or more neighboring birefringent voxels by a predetermined pitch.

16. The optical data storage medium according to claim 15, which includes a plurality of layers of birefringent voxels.

17. The transparent optical data storage medium according to claim 15, which includes a plurality of birefringent voxels arranged as a fiducial mark.

18. A laser writing system, comprising:
a pulsed laser source;
a beam splitter arranged downstream of the pulsed laser source along an optical path, the beam splitter comprising:
a retardation plate;
a first polarization selective diffractive optic downstream of the retardation plate along the optical path; and
a second polarization selective diffractive optic downstream of the first polarization selective diffractive optic along the optical path; and
the laser writing system further comprising a focusing optic downstream of the beam splitter on the optical path.

19. The laser writing system according to claim 18, wherein the first polarization selective diffractive optic comprises one of a polarization grating, a polarization hologram, or a polarization lens; and wherein the second polarization selective diffractive optic comprises one of a polarization grating, a polarization hologram, or a polarization lens.

20. The laser writing system according to claim 18, wherein at least one of the retardation plate, the first polarization selective diffractive optic, and the second polarization selective diffractive optic is rotatably mounted.

* * * * *